United States Patent [19]
Van Bemmel et al.

[11] Patent Number: 5,873,051
[45] Date of Patent: Feb. 16, 1999

[54] METHOD AND APPARATUS FOR PROCESSING AT LEAST TWO SEISMIC DATA SETS DURING A STEP TO DERIVE A THIRD DATA SET

[75] Inventors: Peter P. Van Bemmel, Houston; Randolph E. F. Pepper, Sugar Land, both of Tex.

[73] Assignee: GeoQuest, a division of Schlumberger Technology Corporation, Houston, Tex.

[21] Appl. No.: 717,007

[22] Filed: Sep. 20, 1996

[51] Int. Cl.⁶ .................................................. G06F 19/00
[52] U.S. Cl. ............................................................. 702/17
[58] Field of Search ................................... 364/421, 422; 367/72, 73, 20, 38, 39, 40, 41, 42; 702/14, 17, 18, 16

[56] References Cited

U.S. PATENT DOCUMENTS

| | | | |
|---|---|---|---|
| 3,921,126 | 11/1975 | Waters | 367/40 |
| 4,969,130 | 11/1990 | Wason et al. | 367/73 |
| 5,148,406 | 9/1992 | Brink et al. | 364/421 |
| 5,586,082 | 12/1996 | Anderson et al. | 367/73 |

FOREIGN PATENT DOCUMENTS

WO 96/27141  9/1996  WIPO.

OTHER PUBLICATIONS

Reprint from Blackwell Scientific Publications Ltd, from N.A. Anstey, 1964, "Correlation Techniques—A Review", pp. 163–190: Geophysical Prospecting, V. 12, No. 4, pp. 355–382.

"Slotseq: A Fortran IV Program for Comparing Two Sequences of Observations" by A.D.Gordon—Computers and Geosciences, Feb. 19, 1979, pp. 7–12.

"The Coherency Cube" by Mike Bahorich and Steve Farmer, The Leading Edge, Oct. 1995, pp. 1053–1058.

"An Example of 3–D AVO for Lithology Discrimination in Widuri Field, Asri Basin, Indonesia" by Steven W. Smith et al The Leading Edge Apr. 1996, pp. 283–288.

*Primary Examiner*—Donald E. McElheny, Jr.
*Attorney, Agent, or Firm*—John H. Bouchard

[57] ABSTRACT

A processing system stores a special software known as the Cubemath software. The Cubemath software allows the processing system to process, analyze, and interpret a second set of seismic data relative to a first set of seismic data obtained from either a repeat seismic operation or a single seismic two processing method operation. A first set of 3D seismic data is collected at a particular location on the surface of the earth at time "t1", and a second set of 3D seismic data is collected at that same particular location on the surface of the earth (at a different time "t2" when the repeat seismic operation is being performed). The processing of the second set of seismic data relative to the first set of seismic data is accomplished by: selecting either a volume or a surface to represent the first set of seismic data, selecting either a volume or a surface or a trace or null to represent the second set of seismic data, selecting a specific mathematical operation, selecting a specific type of output (such as a volume output or a surface output), executing a run thereby performing the mathematical operation on the first set of seismic data and the second set of seismic data, and generating a set of data results on an output record medium presented to an operator in the form of the selected type of output.

38 Claims, 29 Drawing Sheets

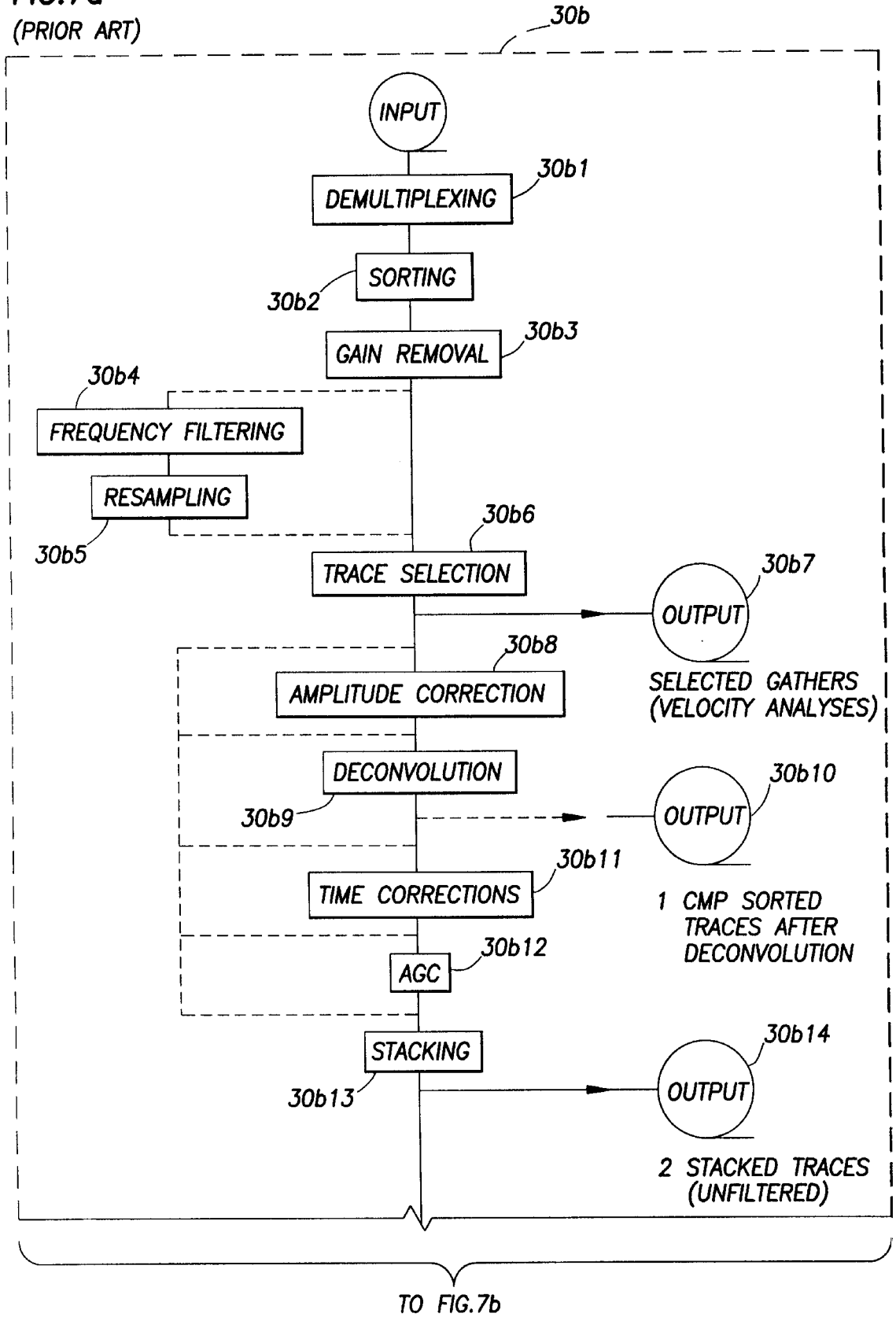

METHOD AND APPARATUS FOR PROCESSING AT LEAST TWO SEISMIC DATA SETS DURING A STEP TO DERIVE A THIRD DATA SET

BACKGROUND OF THE INVENTION

The subject matter of the present invention relates to a seismic data interpretation method and apparatus, and, more particularly, to a method and apparatus for operating on pairs of data obtained from either a repeat seismic operation or for operating on pairs of attributes derived from a single seismic operation performed on the earth's surface where the pairs of data are representative of characteristics of the earth's formation and generating an output record medium from which the characteristics of the earth formation may be determined.

Seismic data is obtained by measuring and recording the data during a "3D seismic operation" performed using a set of geophones situated on the surface of the earth.

A "seismic operation" in general is performed by detonating an explosive energy source at the surface of the earth and, using a set of geophones, measuring a set of sound wave vibrations emerging at the earth's surface but displaced by a plurality of distances (x, x+50 feet, x+100 feet, etc) from the location of the explosive energy source. This set of emerging sound vibrations, produced during the "seismic operation", may be called "2D" seismic data because, in our example, the sound vibrations are propagating in the x–z plane.

However, in reality, the sound vibrations are propagating in three dimensions, that is, the vibrations are propagating along the x, y, and z axes. As a result, the emerging seismic data, emerging from the earth's surface near the set of geophones, should more properly be called "3D" seismic data.

During a seismic operation, the sound vibrations from the explosive energy source will propagate downwardly into the earth, reflect off various earth layers (such as rock layers or sand shale), and propagate upwardly to the earth surface. As a result, the strength of each sound vibration reflecting off an earth layer is a function of the impedence of the earth layer within the earth. Consequently, the 3D seismic data recorded by the geophones at the earth's surface represents a set of characteristics of the earth's formation located within the earth and situated below the set of geophones.

Recall that the aforementioned "3D" seismic data is generated and recorded by the geophones when the 3D seismic operation is performed at the earth's surface, the 3D seismic data representing a set of sound vibrations propagating in three dimensions within the earth (that is, along the x, y, and z axes). However, there is a fourth dimension that should be considered as well which would result in the generation and recordation, by the set of geophones, of "4D" seismic data. That fourth dimension is called "time", or "t". As a result, the four dimensions would be (x, y, z, and t), where x is the horizontal distance, y is the transverse distance, z is the reflection time, and t is the elapsed time.

The 4D seismic data is generated and recorded by the geophones when a "repeat seismic operation" is performed at the surface of the earth. A "repeat seismic operation" is performed in the following manner: performing a 3D seismic operation at a location of the earth's surface at time "t1", and then, at a later time "t2", performing another 3D seismic operation at the same location of the earth's surface at time "t2". If the earth layers, located within the earth below the set of geophones, have changed in any manner (e.g., the new presence of oil, gas, or fluid content), the 3D seismic data emerging from the earth at time "t2" will be different from the 3D seismic data which emerged from the earth at time "t1".

As a result of the performance of the "repeat seismic" operation, two (2) sets of seismic data are measured by the set of geophones: a first set of the seismic data measured by the geophones during time "t1", and a second set of the seismic data measured by the geophones during time "t2".

There is an alternate method practiced for generating the two sets of seismic data. During a single 3D seismic operation, a single set of seismic data is measured by the set of geophones and derived from the 3D seismic operation. However, that single set of seismic data is later processed in two different ways. As a result of the two different ways of processing the single set of seismic data, a pair of attributes are obtained, that is, the two (2) sets of seismic data comprising a first set of seismic data and a second set of seismic data are obtained. This alternate method of generating the two sets of seismic data is hereinafter called the "single seismic two processing method operation".

In addition, multiple data sets can be recorded at the same time, but measuring different types of wave propagation, such as compressional and shear waves. These can be considered a single data set processed two ways.

However, when the first and second sets of seismic data, representative of characteristics of an earth formation, are measured and recorded or otherwise obtained, a processing system located within a workstation should analyze or interpret the first and second sets of seismic data to determine the characteristics of the earth formation situated below the set of geophones at the earth's surface. The processing system must include a special software package (hereinafter called "Cubemath software") which is specifically designed to analyze or interpret the first and second sets of seismic data that were obtained from either the "repeat seismic operation" or the "single seismic two processing method operation". However, heretofore, there existed no such special software package.

As a result, a need exists for a special software package (known as the "Cubemath software") which, when stored in a workstation processing system, will allow the processing system to analyze and interpret the first and second sets of seismic data obtained from either the repeat seismic operation or the single seismic two processing method operation for the purpose of determining the characteristics of the earth formation located below a set of geophones situated at the earth's surface.

SUMMARY OF THE INVENTION

Accordingly, it is a primary object of the present invention to provide a processing system, and a special software package known as a Cubemath software to be used in association with that processing system, for analyzing and interpreting a second set of seismic data relative to a first set of seismic data, obtained from one or more seismic operations and representative of a set of characteristics of an earth formation, for the purpose of determining the characteristics of the earth formation and the possibility of the existence of the underground deposits of hydrocarbons within that formation.

It is a further object of the present invention to provide a processing system, and a special software package known as a Cubemath software to be used in association with that processing system, for processing analyzing and interpreting a second set of seismic data relative to a first set of seismic data, obtained from one or more seismic operations and representative of a set of characteristics of an earth formation, for the purpose of determining the characteristics of the earth formation and the possibility of the existence of underground deposits of hydrocarbon within that formation, the processing of the second set of seismic data relative to the first set of seismic data being accomplished by mathematically operating on the first and second sets of seismic data to produce a result, the result being indicative of characteristics of the earth formation.

It is a further object of the present invention to provide a processing system, and a special software package known as a Cubemath software to be used in association with that processing system, for processing, analyzing and interpreting a second set of seismic data relative to a first set of seismic data, obtained from one or more seismic operations and representative of a set of characteristics of an earth formation, for the purpose of determining the characteristics of the earth formation and the possibility of the existence of underground deposits of hydrocarbon within that formation, the processing of the second set of seismic data relative to the first set of seismic data being accomplished by selecting either a volume or a surface to represent the first set of seismic data, selecting either a volume or a surface or a trace to represent the second set of seismic data, and mathematically operating on the volume or surface of the first set of seismic data and the volume or surface or trace of the second set of seismic data thereby producing a result, the result being indicative of any changes taking place within the earth formation and thereby the characteristics of the earth formation.

It is a further object of the present invention to provide a processing system, and a special software package known as a Cubemath software to be used in association with that processing system, for processing, analyzing and interpreting a second set of seismic data relative to a first set of seismic data, obtained from one or more seismic operations, the processing of the second set of seismic data relative to the first set of seismic data being accomplished by selecting either a volume or a surface to represent the first set of seismic data, selecting either a volume or a surface or a trace to represent the second set of seismic data, selecting a mathematical operation, selecting a specific type of output (such as a volume output or a surface output), performing the aforementioned mathematical operation on the aforementioned volume or surface represented first set of seismic data and the aforementioned volume or surface or trace represented second set of seismic data, and generating a result presented in the form of the selected specific type of output, the aforementioned result being indicative of any changes taking place within the earth formation and thereby indicative of the characteristics of the earth formation.

In accordance with these and other objects of the present invention, a processing system stores a special software known as the "Cubemath software". The Cubemath software allows the processing system to process, analyze, and interpret a second set of seismic data relative to a first set of seismic data which were obtained from either a repeat seismic operation or from a single seismic two processing method operation.

The repeat seismic operation will: (1) collect a first set of 3D seismic data at a particular location on the surface of the earth at time "t1", and (2) collect a second set of 3D seismic data at that same particular location on the surface of the earth at time "t2".

The single seismic two processing method operation will collect a single set of 3D seismic data at time t1, but, during the single seismic two processing method operation, that single set of 3D seismic data collected at time t1 will be processed in two different ways thereby producing pairs of attributes derived from a single seismic operation, that is: (1) a first set of 3D seismic data, and (2) a second set of 3D seismic data.

The processing of the second set of 3D seismic data relative to the first set of 3D seismic data is accomplished by selecting either a volume or a surface to represent the first set of 3D seismic data, selecting either a volume or a surface or a trace to represent the second set of 3D seismic data, selecting a specific mathematical operation, selecting a specific type of output (such as a volume output or a surface output), executing a run thereby performing the aforementioned specific mathematical operation on the volume or surface of the first set of seismic data and the volume or surface or trace of the second set of seismic data, and generating a result on an output record medium, such as a CRT display or a computer printout or other display medium, in response to the performance of the specific mathematical operation. That result is presented to a user or operator in the form of the specific type of output which was previously selected. The aforementioned result, presented in the form of the selected specific type of output, will illustrate any changes that occurred within the earth formation: (1) for the repeat seismic operation, between the time "t1" and the time "t2", when the first and second sets of 3D seismic data were each collected, and (2) for the single seismic two processing method operation, at time t1, when the first and second sets of 3D seismic data were derived from a single set of seismic data obtained during the single seismic operation. Those changes in the earth formation will be indicative of the characteristics of the earth formation and the possibility of the existence of underground deposits of hydrocarbon (i.e.—oil) in the earth formation.

By referring to FIGS. 8, 9, 11, 15, 16, 21, and 28 and using a workstation based processing system including the Cubemath Software of the present invention, an operator sitting at the workstation will make the following selections:

(1) the operator selects primary data 56 by clicking on the first cube 34, (2) the operator selects the data type for the selected primary data, such as "volume 62", (3) the operator selects secondary data 70a in FIG. 9, (4) the operator selects the data type for the secondary data, such as volume 70c, (5) the operator selects a mathematical operation 70j1, and, in the example of the preferred embodiment in FIG. 11, the selected mathematical operation 70j4 is V3=V1/V2, (6) the operator selects an output 80a in FIG. 15, (7) the operator selects a data type 80b for the selected output, such as volume 80c, (8) the operator defines a new seismic volume 80e2 in FIG. 21, and (9) the operator selects the "execute" icon 42 in FIG. 28 which executes the "execute" code 90a in FIG. 16 and the program runs to generate the "output 80a" and the new seismic volume 80e2.

A geoscientist may use the "output 80a" to perform:

(1) Lithologic Interpretation—This is an example of the use of the aforementioned "single seismic two processing method operation"—Techniques are available to analyze pre-stack seismic data for amplitude versus offset (AVO) effects. Two output volumes created from this process are the pressure wave stack (P) and the gradient volume (G). The combination as a product (P×G) of these can be used by geoscientists as a lithology indication. Their sum (P+G) is related to Poisson's ratio, an elastic property of rock. Their difference (P−G) is an estimate of the Shear wave response.

(2) Time to Depth Transform—The analysis of pre-stack seismic data and well information can yield an average velocity volume which can be combined with the seismic information for transformation to depth. The process involves multiple operations as follows: multiply average velocity at each seismic volume time step and the time step index to yield a depth index (V×T), then, interpolate the seismic amplitude to the desired depth index (sin x/x interpolation).

(3) Analysis of 4D seismic (repeat seismic surveys for reservoir monitoring)—An analysis of the contrast between two seismic surveys acquired at the same location may indicate the migration of reservoir fluids. A simple trace by trace subtraction could be used to highlight these differences if the acquisition of both data had been recorded identically. In general, there are slight differences which can be accounted for by additional operations to adjust time and/or amplitude differences between the data sets, i.e., cross correlation.

(4) Sample variations—Many single volume, volume/surface, volume/trace operations can be performed for such applications as edge detection, volume slicing, hypothesis testing, and post stack processing. These require a combination of the basic mathematical functions provided in accordance with the present invention in this specification.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 7a and 7b illustrate a flowchart of the data reduction software of FIG. 4;

DETAILED DESCRIPTION OF THE PREFERRED EMBODIMENT

Figure 1:
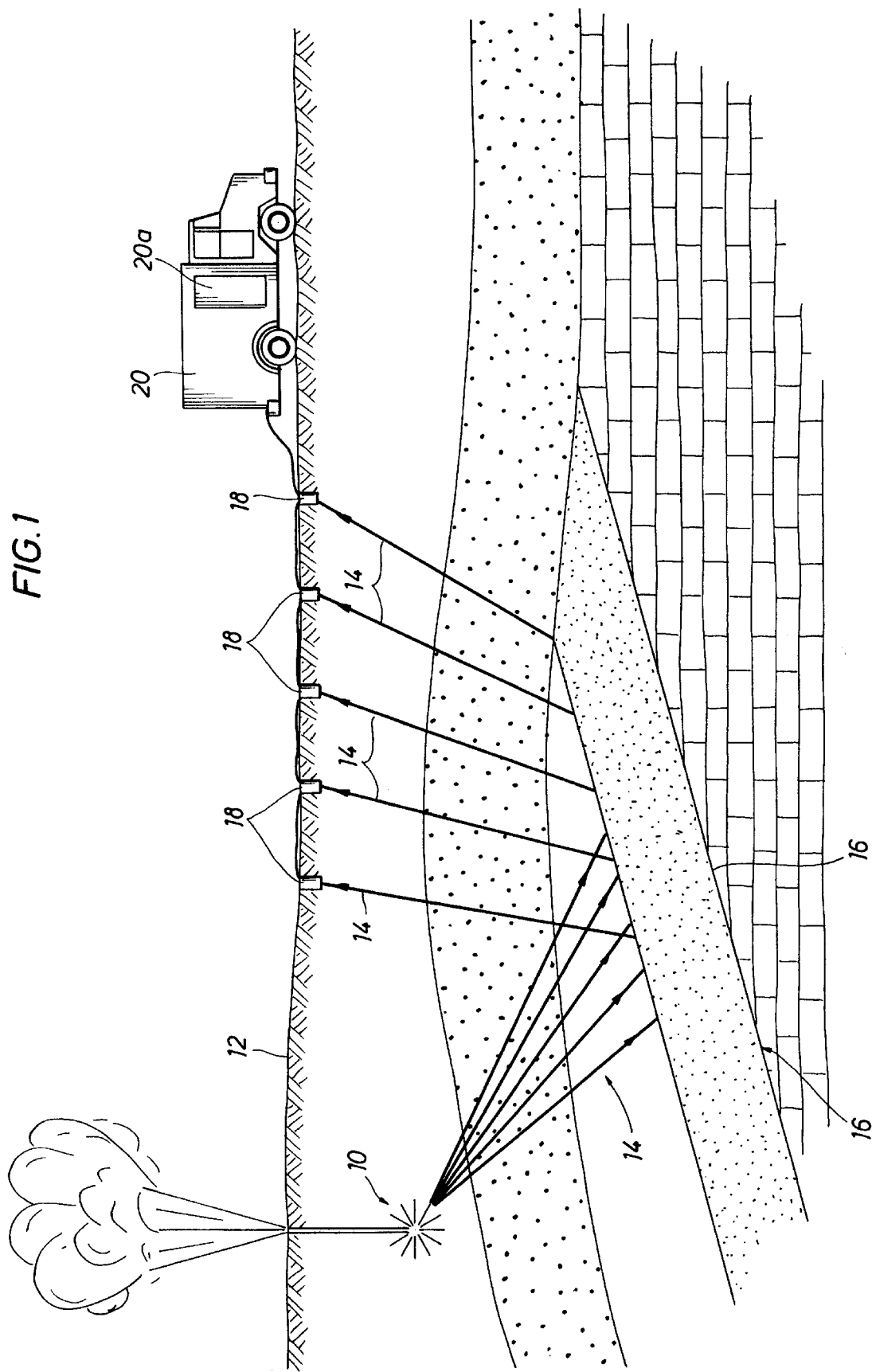
FIGS. 1 and 2 illustrate the method and apparatus needed for performing a 3D seismic operation.
Figure 2:
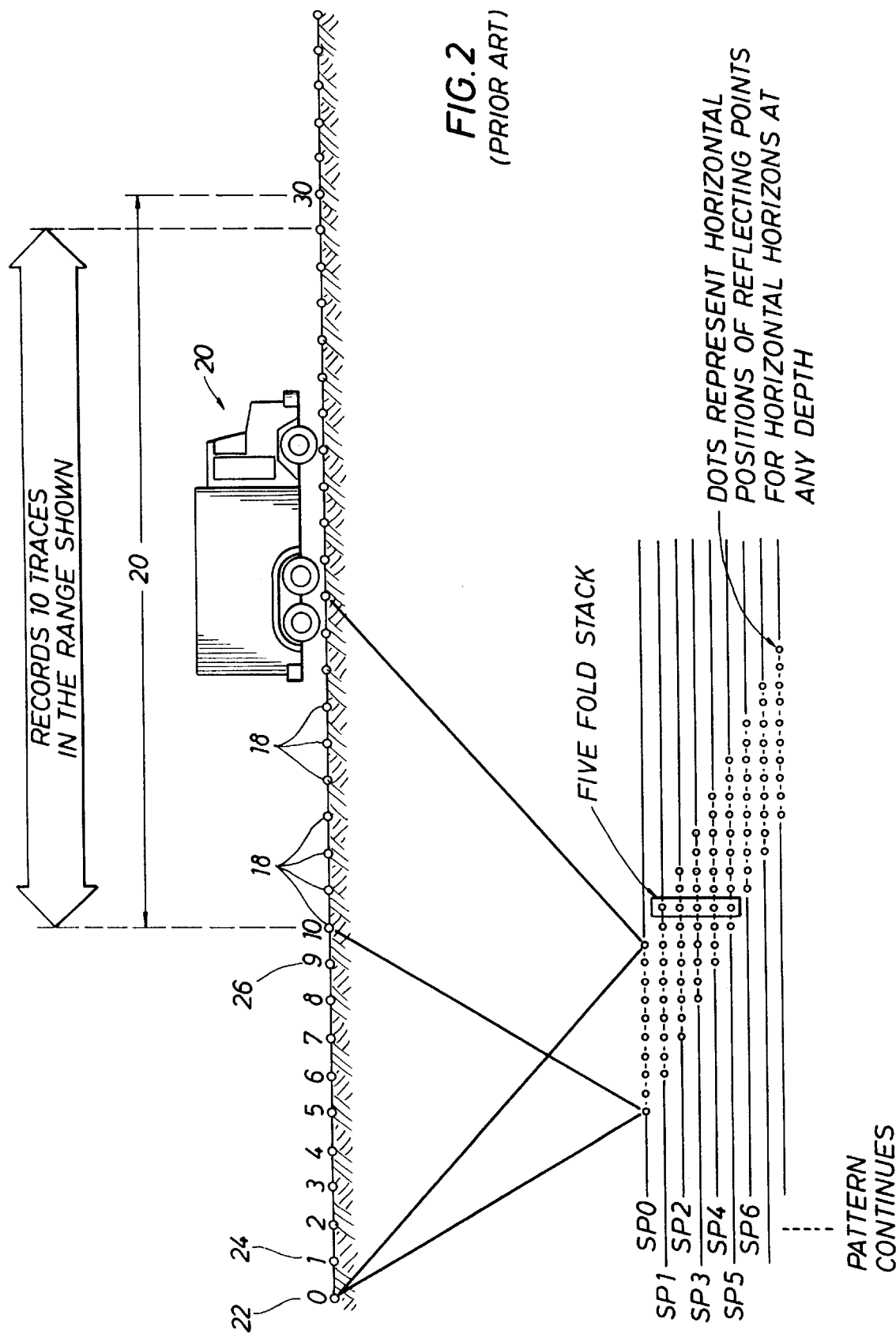

Referring to FIGS. 1 and 2, an apparatus and associated method for performing a 3D seismic operation at a location of the earth's surface is illustrated.

In FIG. 1, an explosive energy source 10 situated below the surface of the earth 12 detonates and generates a plurality of sound vibrations 14 which propagate downwardly and reflect off a layer 16 within the earth. The layer 16 could be a rock layer or a sand or shale layer. When the sound vibrations reflect off the layer 16 in the earth, the sound vibrations 14 will propagate upwardly and will be received in a plurality of receivers 18 called geophones 18. The plurality of geophones 18 will each generate an electrical signal in response to the receipt of a sound vibration therein and a plurality of electrical signals will be generated from the geophones 18, the plurality of signals being received in a recording truck 20. The plurality of electrical signals from the geophones 18 represent a set of characteristics of the earth formation located within the earth below the geophones 18, and, in particular, the characteristics of that portion of the earth located adjacent the layer 16 in the earth. The truck 20 contains a computer 20a which will receive and store the plurality of signals received from the geophones 18. An output record medium will be generated from the computer 20a in the recording truck 20 which will include and/or display and/or store the plurality of electrical signals that are representative of the characteristics of the earth formation situated in the earth below the geophones 18. The apparatus and method described above with reference to FIG. 1 is called a 2D (for two dimensional) seismic operation because the above referenced method referred to generating the sound vibrations 14 along the x–z axes. However, in reality, the sound vibrations 14 would be propagating along the x, y, and z axes. As a result, the apparatus and method described above with reference to FIG. 1 should more properly be called a "3D" seismic operation (since the sound vibrations 14 propagate along the x, y, and z axes in FIG. 1). The x-axis represents the horizontal distance, the y-axis represents the transverse distance, and the z-axis represents the reflection time.

Referrring to FIG. 2, another method and apparatus for performing a 3D seismic operation is illustrated. FIG. 2 was taken from a book entitled "Seismic Velocity Analysis and the Convolutional Model", by Enders A. Robinson, the disclosure of which is incorporated by reference into this specification.

In FIG. 2, the 3D seismic operation of FIG. 1 is performed 10 different times. For example, when the explosive energy source 10 is located at position 22 (the first position or position "0" along the surface of the earth) in FIG. 2, a first plurality of electrical signals from the geophones 18 are stored in the computer 20a in the recording truck 20. The explosive energy source is moved to position 24. When the explosive energy source 10 is located in position 24 (the second position or position "1" along the surface of the earth), a second plurality of electrical signals are stored in the computer 20a in the recording truck 20. The explosive energy source 10 is repeatedly and sequentially moved from positions "2" to "9" in FIG. 2 until it is located at position 26 (i.e.—position "9" which is the tenth position) on the surface of the earth. When the explosive energy source 10 is located in position 26 (the tenth position along the surface of the earth), a tenth plurality of electrical signals are stored in the computer 20a in the recording truck 20. As a result, in FIG. 2, the recording truck 20 records 10 traces (ten sets of electrical signals, where each set is a plurality of electrical signals) between position 22 and position 26 along the surface of the earth. An output record medium will be generated by the computer 20a in the recording truck 20 which includes the 10 traces or ten set of electrical signals received from the geophones 18. The method and apparatus described above with reference to FIGS. 1 an 2 represent a "3D seismic operation".

Figure 3:
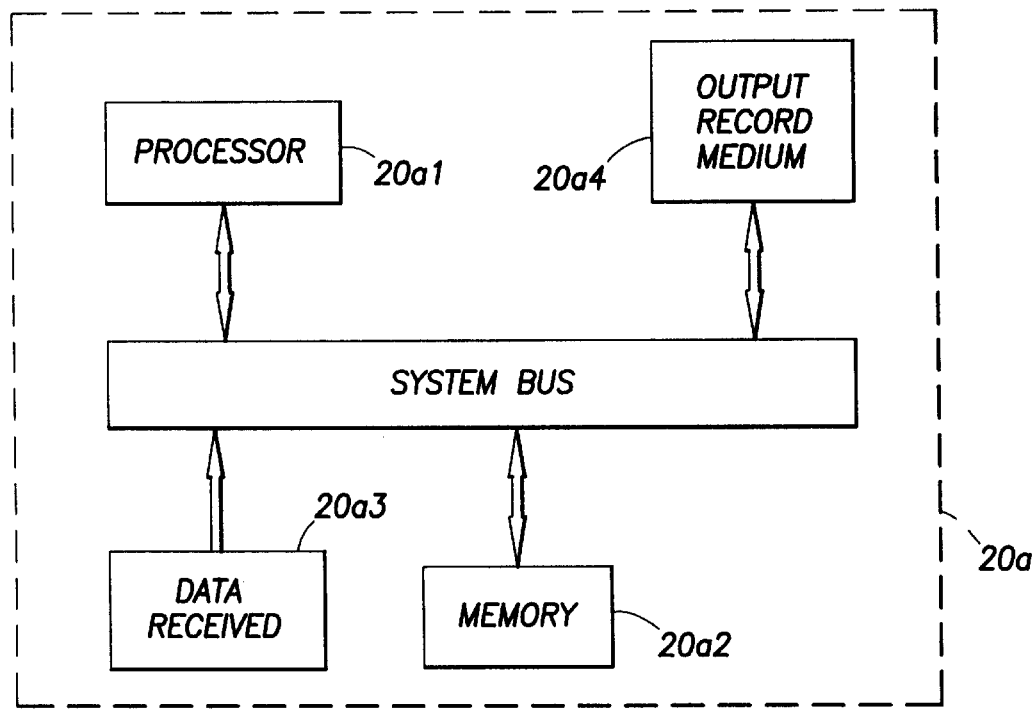
FIG. 3 illustrates a simplified diagram of the processing system present in the recording truck used during the 3D seismic operation for collecting the first and second sets of 3D seismic data obtained during the 3D seismic operation of FIGS. 1 and 2 and for storing the first and second sets of 3D seismic data on an output record medium, such as a magnetic tape.

Referring to FIG. 3, a more detailed construction of the recording truck computer 20a is illustrated. The recording truck computer 20a includes a processor 20a1 and a memory 20a2 connected to a system bus. The ten traces or ten sets of electrical signals, received from the geophones 18 of FIGS. 1 and 2 and generated by the geophones 18 during the 3D seismic operation, would be received into the recording truck computer 20a, via the "Data received" block 20a3 in FIG. 3 connected to the system bus, and stored in the memory 20a2 of the recording truck computer 20a. When desired, an output record medium 20a4, also connected to the system bus, is generated which will include, store, and/or display the ten traces or ten sets of electrical signals received from the geophones 18.

The above discussion describes a three-dimensional (3D) seismic operation. However, a seismic technique practiced in the field, called a 4-dimensional or 4D seismic operation, involves the use of four dimensions, that is, the x-axis and the y-axis and the z-axis for propagating the sound vibrations 14 within the three dimensions in the earth, and a fourth dimension called "time" or "t". The fourth dimension, time, represents the elapsed time and is used to practice a relatively new seismic operation hereinafter called a "repeat seismic operation" or a "4D seismic operation".

The "repeat seismic operation" or "4D seismic operation" is performed in the following manner, with reference again to FIGS. 1 and 2: A first 3D seismic operation is performed at time "t1" at a particular location on the surface of the earth, the 3D seismic operation being discussed above with reference to FIGS. 1 and 2. Then, when a predetermined period of time, such as 6 months, has elapsed following time "t1" when the first 3D seismic operation was performed, a second 3D seismic operation is performed at time "t2" at the same particular location on the surface of the earth. Recalling that one (1) set of data, consisting of the ten traces or ten sets of electrical signals, are received from the geophones 18 when one 3D seismic operation is performed, when a "4D seismic operation" or a "repeat seismic operation" is completed, two (2) sets of 3D seismic data are received and stored in the recording truck computer 20a, as follows: (1) a first set of ten traces or ten sets of electrical signals (hereinafter called, "a first set of 3D seismic data"), and (2) a second set of ten traces or ten sets of electrical signals (hereinafter called "a second set of 3D seismic data"). When the output record medium 20a4 of FIG. 3 is generated by the recording truck computer 20a, the "first set of 3D seismic data" is stored and/or displayed on a first output record medium 20a4; and, six months later, the "second set of 3D seismic data" is stored and/or displayed on a second output record medium 20a4. There are now two (2) output record mediums 20a4: a first one which stores the first set of 3D seismic data, and a second one which stores the second set of 3D seismic data measured about 6 months after the measurement of the first set of 3D seismic data.

Recall the "single seismic two processing method operation": a single 3D seismic operation is performed and a single set of 3D seismic data is obtained; that single set of 3D seismic data is processed in two (2) different ways to thereby produce two (2) separate sets (or pairs of attributes) of 3D seismic data: a first set of 3D seismic data, and a second set of 3D seismic data. Two output record mediums 20a4 are prepared: a first one which stores the first set of 3D seismic data, and a second one which stores the second set of 3D seismic data.

Figure 4:
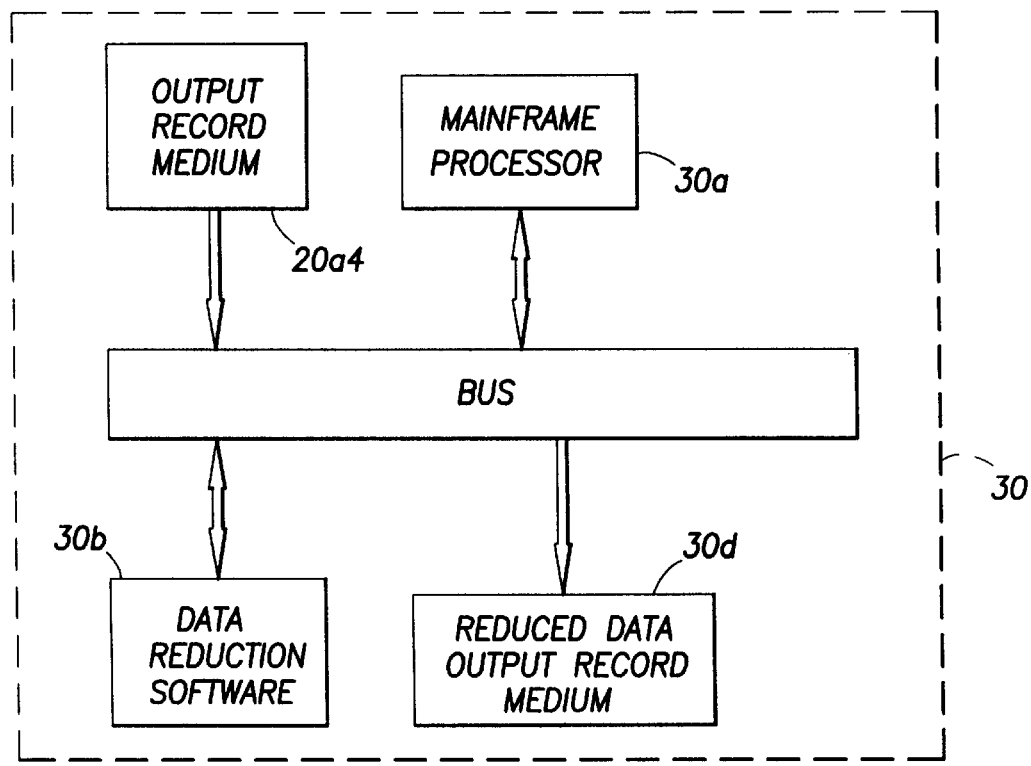
FIG. 4 illustrates a simplified diagram of a mainframe computer which uses a stored data reduction software to perform data reduction on the first and second sets of 3D seismic data stored on the output record medium of FIG. 3 and producing a reduced data output record medium.

Referring to FIG. 4, a simplified diagram of a mainframe computer is illustrated which uses a stored "data reduction software" to perform a "data reduction" operation on the first and second sets of 3D seismic data stored on the first and second output record mediums 20a4, respectively, of FIG. 3, the mainframe computer producing a first reduced data output record medium and a second reduced data output record medium, each of which display and/or store reduced versions of the first and second sets of 3D seismic data.

In FIG. 4, a mainframe computer 30 includes a mainframe processor 30a connected to a system bus and a memory 30b also connected to the system bus which stores a "data reduction software" therein. The first and second output record mediums 20a4 of FIG. 3 are connected to the system bus of FIG. 4, and the first set of 3D seismic data and the second set of 3D seismic data from the first and second output record mediums 20a4 are each made available to the mainframe processor 30a and its associated data reduction software stored in the memory 30b. The mainframe processor 30a will execute the data reduction software stored in memory 30a and, as a result of the execution of the data reduction software, the mainframe processor 30a will: perform a "data reduction" operation on the first and second sets of 3D seismic data stored on the first and second output record mediums 20a4, generate a "first reduced data output record medium" 30d associated with the first set of 3D seismic data stored on the first output record medium 20a4, and generate a "second reduced data output record medium" 30d associated with the second set of 3D seismic data stored on the second output record medium 20a4. Therefore, in FIG. 4, when the data reduction software in memory 30b is executed by the mainframe processor 30a in association with the first and second sets of 3D seismic data, two reduced data output record mediums 30d will be generated: a first one 30d which stores a data-reduced version of the first set of 3D seismic data, and a second one 30d which stores a data-reduced version of the second set of 3D seismic data. The data-reduced versions of the first and second 3D seismic data, stored on the reduced data output record mediums 30d, represent spatially corrected subsurface images of the earth formation of FIG. 1. The data reduction technique, described below with reference to FIGS. 7a and 7b, involves the vector sum of the reflections 14 off the earth's layer 16 of FIG. 1.

Figure 7B:
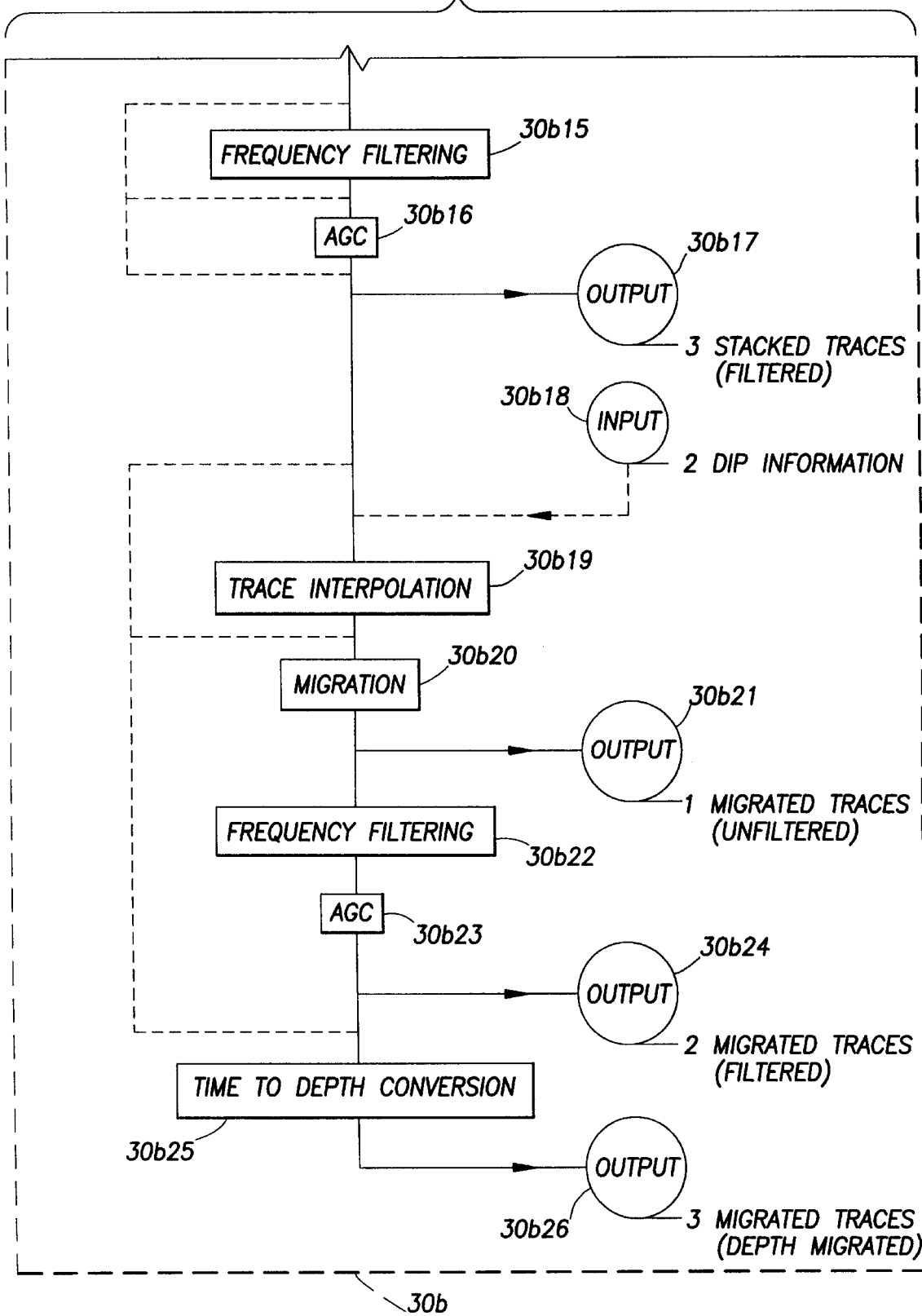

Referring to FIGS. 7a and 7b, a flowchart of the data reduction software stored in the memory 30b of the mainframe computer 30 of FIG. 4 is illustrated. The data reduction software flowchart of FIGS. 7a and 7b is taken from a book entitled "Seismic Velocity Analysis and the Convolutional Model" by Enders A. Robinson, the disclosure of which has already been incorporated by reference into this specification.

In FIGS. 7a and 7b, the flowchart of the data reduction software includes the following blocks: a demultiplexing block 30b1 connected to the input, a sorting block 30b2, a gain removal block 30b3, a frequency filtering block 30b4, a resampling block 30b5, a trace selection block 30b6, an output 30b7 labelled "selected gathers (velocity analyses), amplitude correction 30b8, deconvolution 30b9, a second output 30b10 labelled "CMP sorted traces after deconvolution", a time corrections block 30b11, an AGC block 30b12, a stacking block 30b13, a third output 30b14 labelled "stacked traces (unfiltered)", a frequency filtering block 30b15, another AGC block 30b16, a fourth output 30b17 labelled "stacked traces (filtered)", a second input labelled "dip information" 30b18, a trace interpolation block 30b19, a migration block 30b20, a fifth output 30b21 labelled "migrated traces (unfiltered)", a frequency filtering block 30b22, an AGC block 30b23, a sixth output 30b24 labelled "migrated traces (filtered)", a time to depth correction block 30b25, and a seventh output 30b26 labelled "migrated traces (depth migrated)". In the flowchart of FIGS. 7a and 7b, any of the outputs 30b7, 30b10, 30b14, 30b17, 30b21, 30b24, and 30b26 can be used as inputs to the interpretation workstation 32 discussed below and illustrated in FIG. 5 of the drawings.

Figure 5:
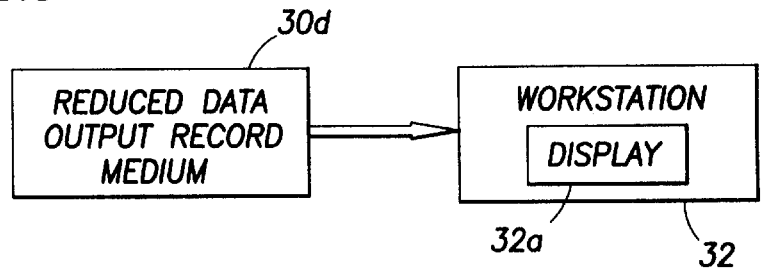
FIG. 5 illustrates a workstation and associated display for receiving the reduced data output record medium.

Referring to FIG. 5, an interpretation workstation 32, in accordance with the present invention, having a display 32a, is electrically connected to and receives the two first and second reduced data output record mediums 30d (such as a magnetic tape) which were generated by the mainframe computer 30 of FIG. 4. The data-reduced versions of the first set of 3D seismic data and the second set of 3D seismic data (received using the "repeat seismic operation" or the "single seismic two processing method operation"), stored on the first reduced data output record medium 30d and the second reduced data output record medium 30d, are loaded into the workstation 32 of FIG. 5.

Figure 6:
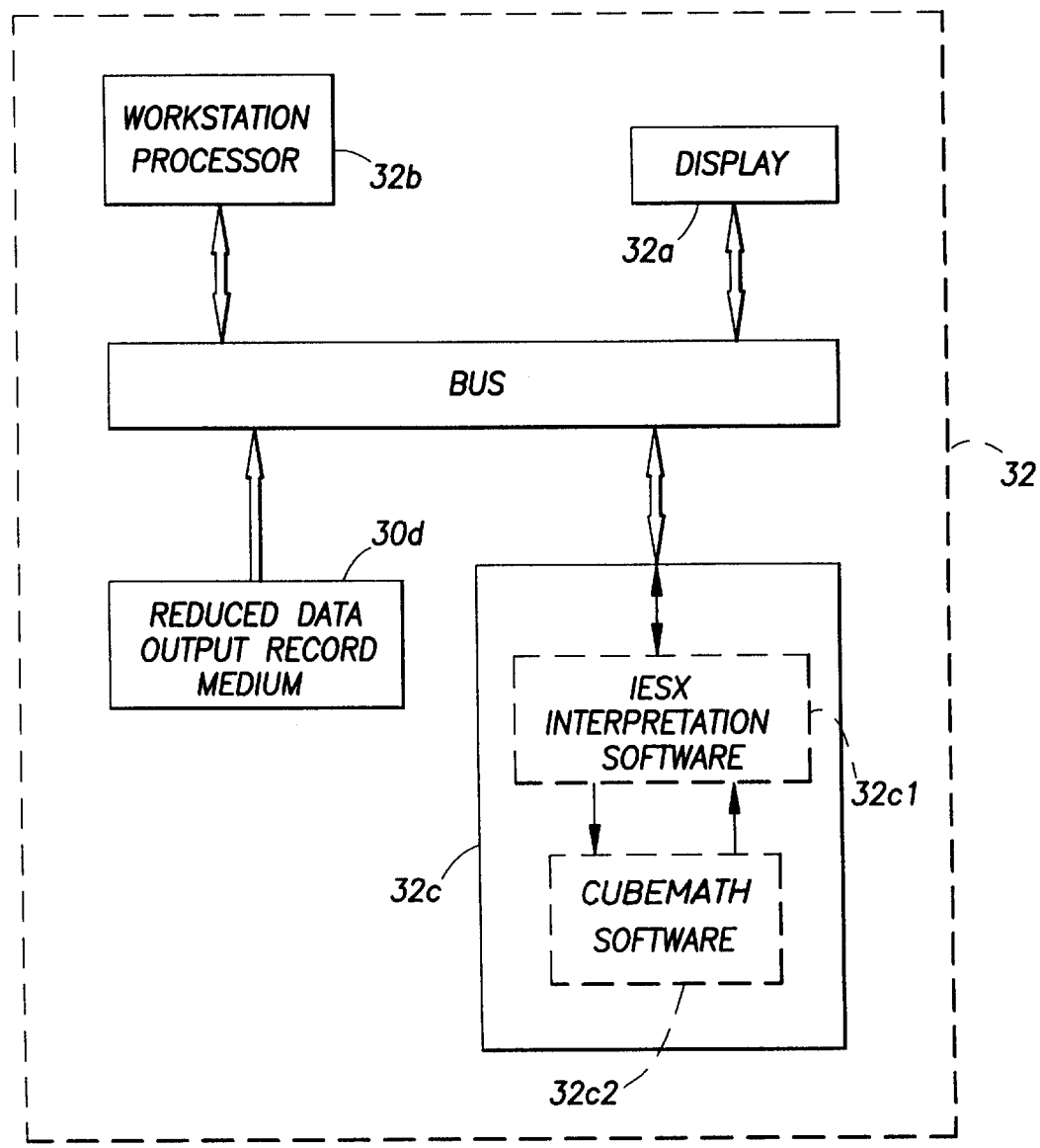
FIG. 6 illustrates in greater detail the workstation of FIG. 5 showing the memory in the workstation which stores the cubemath software that allows the processing system of the present invention to process, analyze, and interpret a second set of seismic data relative to a first set of seismic data obtained from a repeat seismic operation.

Referring to FIG. 6, the interpretation workstation 32 of the present invention of FIG. 5 is shown in greater detail.

In FIG. 6, the workstation 32 includes the display 32a and the workstation processor 32b connected to the system bus, and a memory 32c also connected electrically to the system bus. The first and second reduced data output record mediums 30d are connected to the bus; as a result, the first and second set of 3D seismic data stored on the first and second reduced data output record mediums 30d are made available to the workstation processor 32b and its associated software stored in the workstation memory 32c. The workstation memory 32c stores two types of software: an IESX Interpretation software 32c1, and a Cubemath software 32c2 in accordance with the present invention. When the workstation processor 32b executes the Cubemath Software 32c2, in association with the IESX Software 32c1, the data-reduced version of the first set of 3D seismic data (obtained at time t1 using the repeat seismic operation) may be mathematically operated on the data-reduced version of the second set of 3D seismic data (obtained at time t2 using the repeat seismic operation) thereby producing a "particular output", from which a geoscientist can determine the characteristics of the formation layer 16 of FIG. 1. For example, the geoscientist may be able to determine, from the "particular output", what kind of rock exists in the formation, changing fluid content in the formaton, or the depth to the formation layer 16. This specification will provide additional information, below, regarding other possible conclusions which the geoscientist may draw from the "particular output" generated by workstation processor 32b of the present invention when the workstation processor 32b executes the Cubemath software 32c2 of the present invention.

The workstation 32 can comprise a Silicon Graphics Indigo2 workstation. The operating system is IRIX 5.3. The software program can be written in C programming language under Unix and Motif standards. The program can be recomplied and run on Sun workstations in conjunction with other IESX products listed below, which are available from Geoquest, a division of Schlumberger Technology Corporation, Houston, Tex. In addition to the Unix workstation operating environment, the minimum IESX Interpretation software 32c1 required to run the Cubemath software 32c2 of the present invention is as follows (such IESX Interpretation software 32c1 being available from Geoquest, a division of Schlumberger Technology Corporation, Houston, Tex.):

1. IESX runtime license, part no. UAMR1-QD1
2. IESX data manager, part no. UAMD1-QD1
3. IESX Seis3DV, Part No. UA3D1-QD1

A brief description of the functional operation of the present invention will be set forth in the following two paragraphs with reference to FIGS. 23, 33–34 of the drawings.

Figure 23:
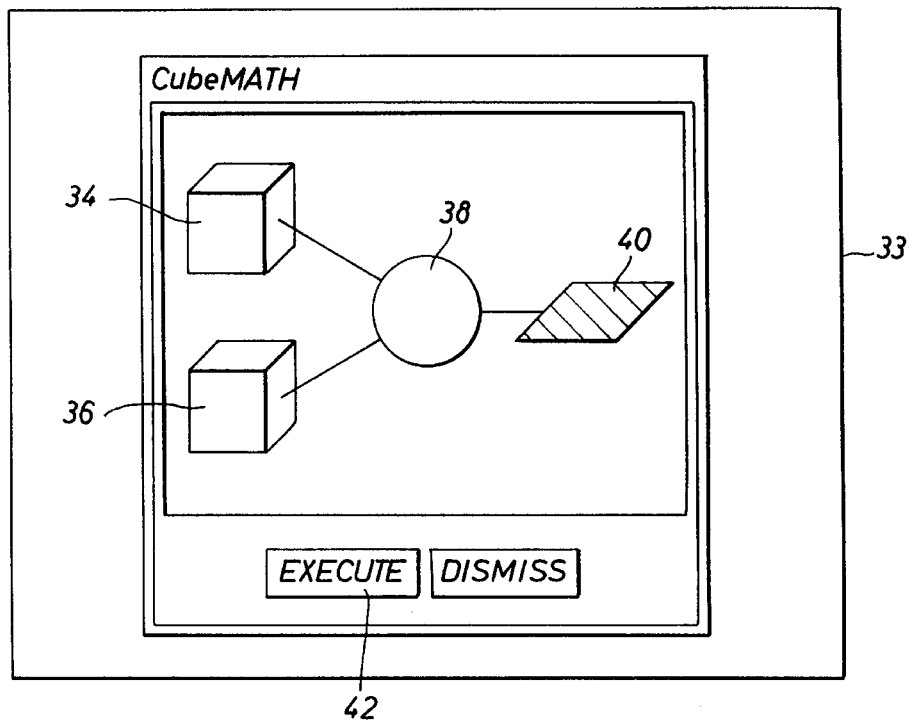

In FIG. 23, when the Cubemath software 32c2 (and the IESX interpretation software 32c1) are executed by the workstation processor 32b of FIG. 6, the initial state window 33 in FIG. 23 will be displayed on the display 32a in FIG. 6. In the initial state window 33, a first cube 34 represents the data-reduced first set of 3D seismic data measured by the geophones 18 of FIG. 1 at time "t1" (when the repeat seismic operation is performed) which subsequently underwent the data reduction processing of FIG. 4. A second cube 36 represents the second set of 3D seismic data measured by the geophones 18 of FIG. 1 at time "t2" (about 6 months after time t1 when the repeat seismic operation is performed) which subsequently underwent the data reduction processing of FIG. 4. The operator selects a mathematical operation 38 in FIG. 23. The operator then selects a particular output 40. Then, the operator selects "execute" 42. When execute 42 is selected, the first cube of data 34 is mathematically operated on the second cube of data 36 using the mathematical operation 38, and then the particular output 40 is generated. The geoscientist uses the particular output 40 to determine the characteristics of the earth formation for the ultimate purpose of determining the existence of underground deposits of hydrocarbon in the formation.

Figure 33:
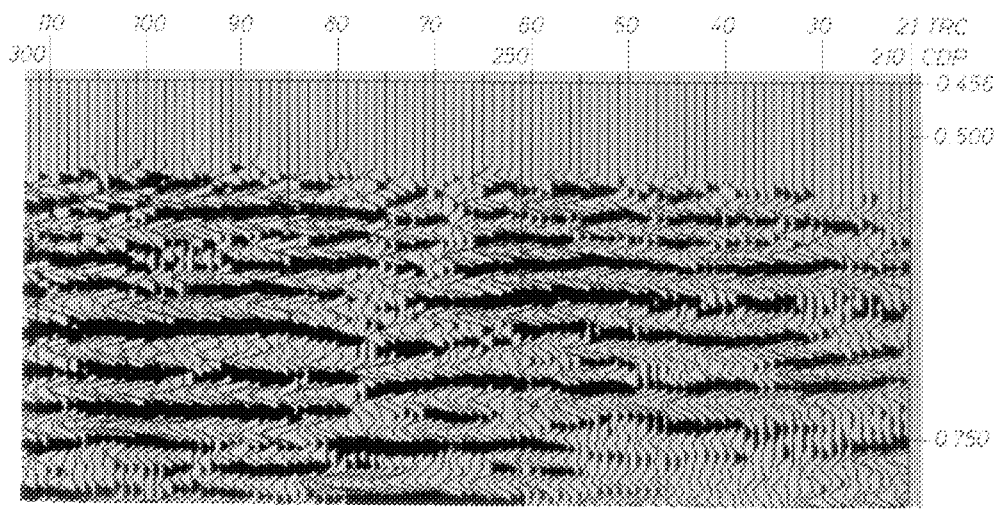
FIGS. 33–35 illustrate examples of the specific type of output (such as a volume output or a surface output) that are selected by the operator.
Figure 34:
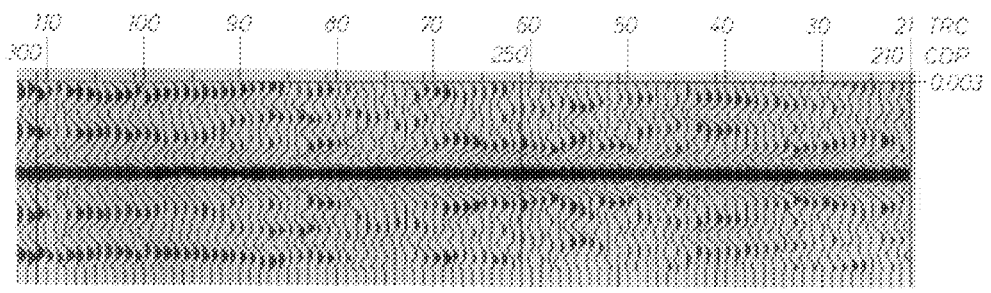

In FIGS. 33–34, examples of the "particular output" 40 are illustrated. FIGS. 33–34 represent the mathematical operation $Vo=V1*V1$, where FIG. 33 represents the input volume V1 and FIG. 34 represents the output volume Vo. In FIG. 33, the same volume V1 is used as the primary and secondary input seismic volumes, and, in FIG. 34, an output autocorrelation volume Vo is presented for geophysical analysis. Possible uses of the "particular output" 40 include mathematical operations performed on seismic volumes to combine, contrast, and transform the original inputs. A few examples, to be discussed in more detail below, include lithologic interpretation, time to depth transform, analysis of 4D seismic or repeat seismic surveys for reservoir monitoring, and sample variations.

Figure 35:
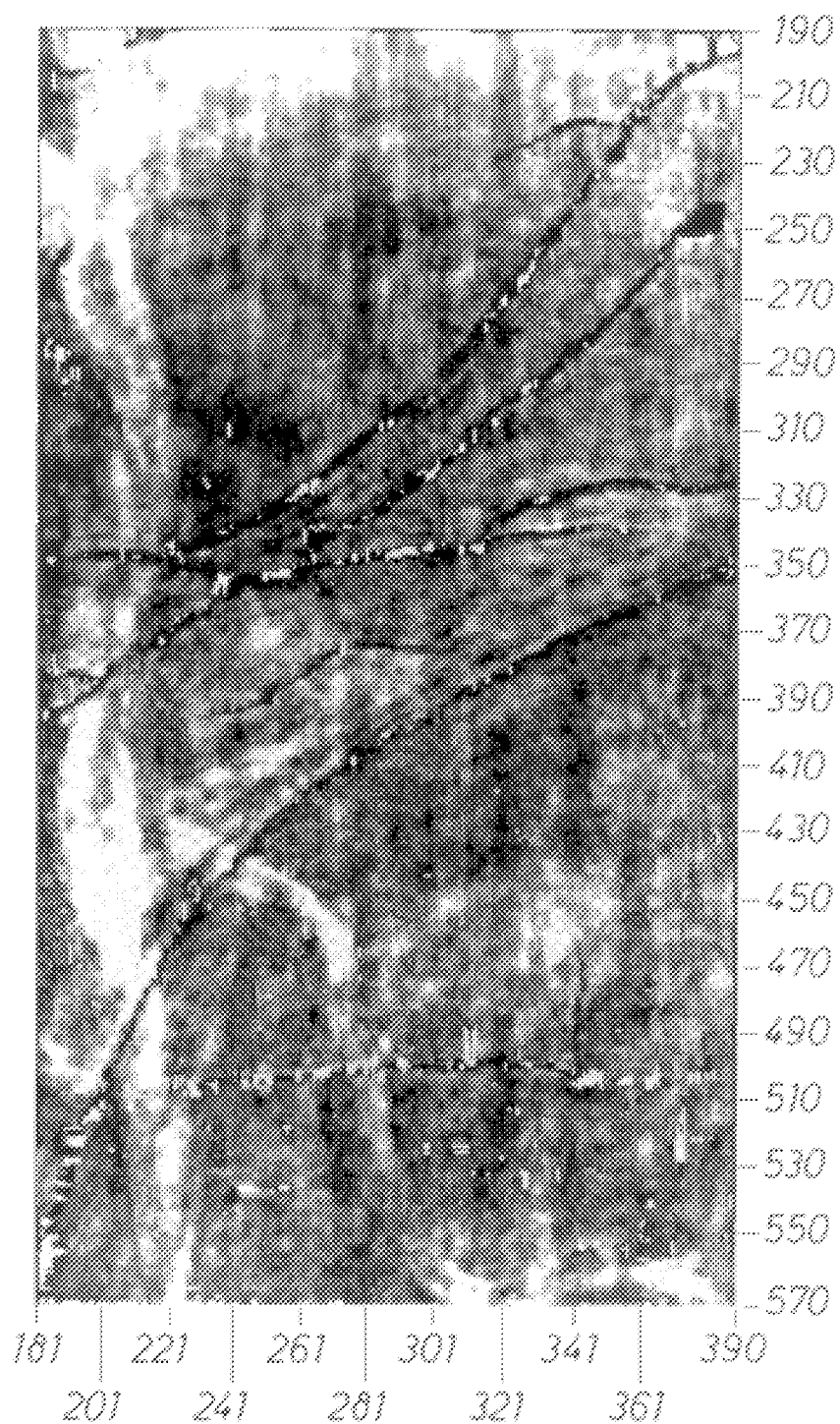

Referring to FIGS. 8–35, a plurality of state diagrams are illustrated in FIGS. 8–22 representing the Cubemath software 32c2 of FIG. 6 of the present invention, a plurality of window displays are illustrated in FIGS. 23–32 that are generated on display 32a of FIGS. 5 and 6 when the Cubemath software 32c2 of FIGS. 8–22 is executed, and two examples of the aforementioned "particular output" are illustrated in FIGS. 33–35 for use by the geoscientist in determining the characteristics of an earth formation from a geological standpoint when the execution of the Cubemath software 32c2 is complete.

Figure 8:
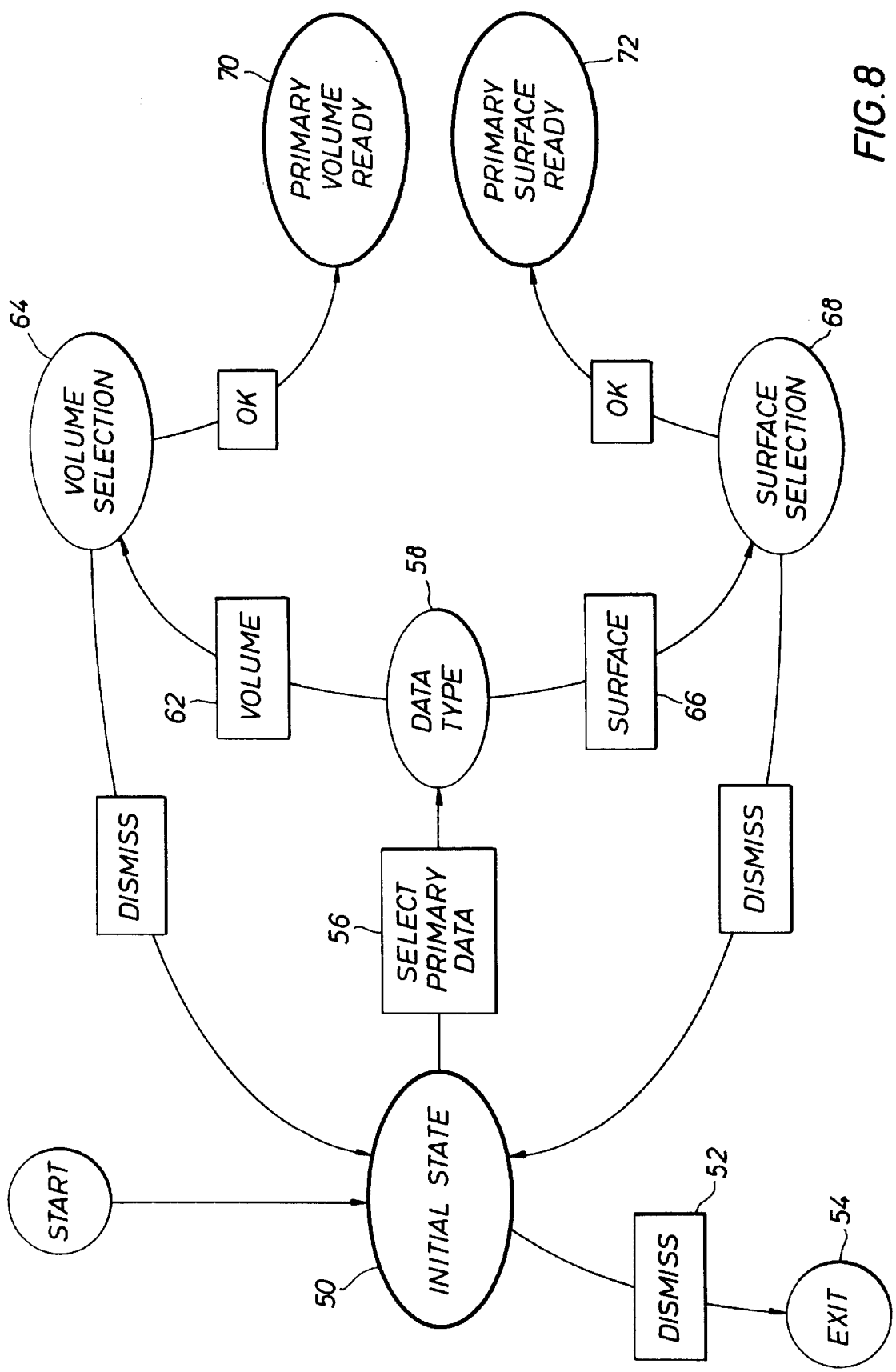
FIGS. 8–22 illustrate state diagrams of the cubemath software of FIG. 6 which allows the processing system of FIG. 6 of the present invention to process, analyze, and interpret a second set of seismic data relative to a first set of seismic data obtained from a repeat seismic operation, FIGS. 8–22 including, FIG. 8 illustrating the initial state and including primary volume ready, primary surface ready, volume selection, and surface selection, FIG. 9 illustrating a detailed construction of the primary volume ready of FIG. 8, FIG. 10 illustrating a detailed construction of the primary surface ready of FIG. 8, FIG. 17 illustrating a detailed construction of the volume selection of FIG. 8, FIG. 18 illustrating a detailed construction of the surface selection of FIG. 8, FIG. 9 illustrating primary volume ready and including trace selection, volume/trace ready, surface selection, volume/surface ready, volume selection, and volume/volume ready, FIG. 19 illustrating a detailed construction of the trace selection of FIG. 9, FIG. 13 illustrating a detailed construction of the volume/trace ready of FIG. 9, FIG. 18 illustrating a detailed construction of the surface selection of FIG. 9, FIG. 12 illustrating a detailed construction of the volume/surface ready of FIG. 9, FIG. 17 illustrating a detailed construction of the volume selection of FIG. 9, and FIG. 11 illustrating a detailed construction of the volume/volume ready of FIG. 9, FIG. 10 illustrating primary surface ready and including surface selection and surface/surface ready, FIG. 18 illustrating a detailed construction of the surface selection of FIG. 10, FIG. 14 illustrating a detailed construction of the surface/surfaec ready of FIG. 10, FIG. 11 illustrating volume/volume ready and including parameter control and operator set, FIG. 20 illustrating a detailed construction of parameter control of FIG. 11, FIG. 15 illustrating a detailed construction of operator set of FIG. 11, FIG. 12 illustrating volume/surface ready and including parameter control and operator set, FIG. 20 illustrating a detailed construction of parameter control of FIG. 12, FIG. 15 illustrating a detailed construction of operator set of FIG. 12, FIG. 13 illustrating volume/trace ready and including parameter control and operator set, FIG. 20 illustrating a detailed construction of parameter control of FIG. 13, FIG. 15 illustrating a detailed construction of operator set of FIG. 13, FIG. 14 illustrating surface/surface ready and including parameter control and operator set, FIG. 20 illustrating a detailed construction of parameter control of FIG. 14, FIG. 15 illustrating a detailed construction of operator set of FIG. 14, FIG. 15 illustrating operator set and including volume output definition, surface output definition, and execution ready, FIG. 21 illustrating a detailed construction of volume output definition of FIG. 15, FIG. 22 illustrating a detailed construction of surface output definition of FIG. 15, FIG. 16 illustrating a detailed construction of execution ready of FIG. 15, FIGS. 23–32 illustrate the individual displays presented to the operator on the display (i.e., the CRT) of the workstation of FIGS. 5 and 6, FIGS. 23–32 including, FIG. 23 illustrating the initial state window as indicated by the initial state block of FIG. 8, FIG. 24 illustrating the data selection window as indicated by the data type block of FIGS. 8 and 9, FIG. 25 illustrating the primary volume ready window as indicated by the primary volume ready block of FIG. 9, FIG. 26 illustrating the operator set window as indicated by the available operations block leading to the operator set block of FIGS. 11, 12, 13, and 14, FIG. 27 illustrating the data output window as indicated by the data type block of FIG. 15, FIG. 28 illustrating the execution ready window as indicated by the execution ready block of FIG. 16, FIG. 29 illustrating the volume selection window as indicated by the volume selection and volume selected blocks of FIG. 17, FIG. 30 illustrating the volume output window as indicated by the volume output and the volume defined blocks of FIG. 21, FIG. 31 illustrating the surface output window as indicated by the surface output and the surface selected blocks of FIG. 22, FIG. 32 illustrating the parameter control window as indicated by the parameter control block of FIG. 20.

In FIG. 8, the first of a series of state diagrams representing the Cubemath software 32c2 of the present invention, when executing in the processing system of FIG. 6 of the present invention, is illustrated. In FIG. 8, an initial state 50 is initiated when execution of the Cubemath software 32c2 has started. The user/operator can dismiss 52 and exit 54 from the program at this point if necessary.

In FIG. 23, during the initial state 50, the initial state window 33, representative of the initial state 50, appears on the workstation display 32a of FIGS. 5 and 6. This window display was discussed above. As noted above, the operator sitting at the workstation 32 of FIG. 6 will select "execute" 42. When execute 42 is selected, the first cube of data 34, representing the data-reduced versions of the 3D seismic data obtained at time "t1", is mathematically operated on the second cube of data 36, representing the data-reduced versions of the 3D seismic data obtained at time "t2" (when the repeat seismic operation is being performed) by using the mathematical operation 38, and, following the mathematical operation, the particular output 40 is generated. The particular output is used by the geoscientist as noted above and discussed more fully below. If the "single seismic two processing method operation" is being performed, the first cube 34 represents the data reduced version of the first set of seismic data (derived from the original single seismic operation from which a pair of attributes or sets of seismic data are derived when processed in two different ways) and the second cube 36 represents the data reduced version of the second set of seismic data.

In FIG. 8, the operator will then select the primary data 56, at which time, the operator must specify the primary data type 58.

Figure 24:
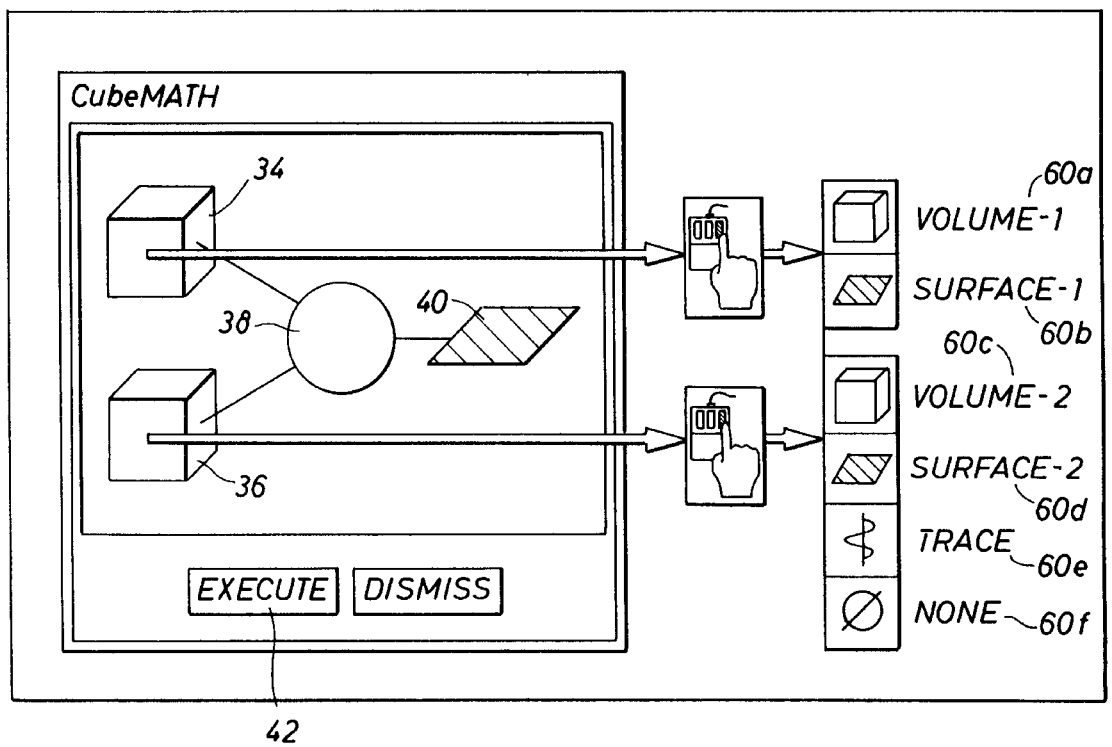

In FIG. 24, the primary data type selection is illustrated. In FIG. 24, when the primary data type 56 is selected, the operator will move the cursor to first cube 34 where he will click on the first cube 34. The primary data type has been selected. In order to specify the primary data type 58, the operator sitting at workstation 32 must then select either the volume 1 60a or the surface 1 60b.

Figure 17:
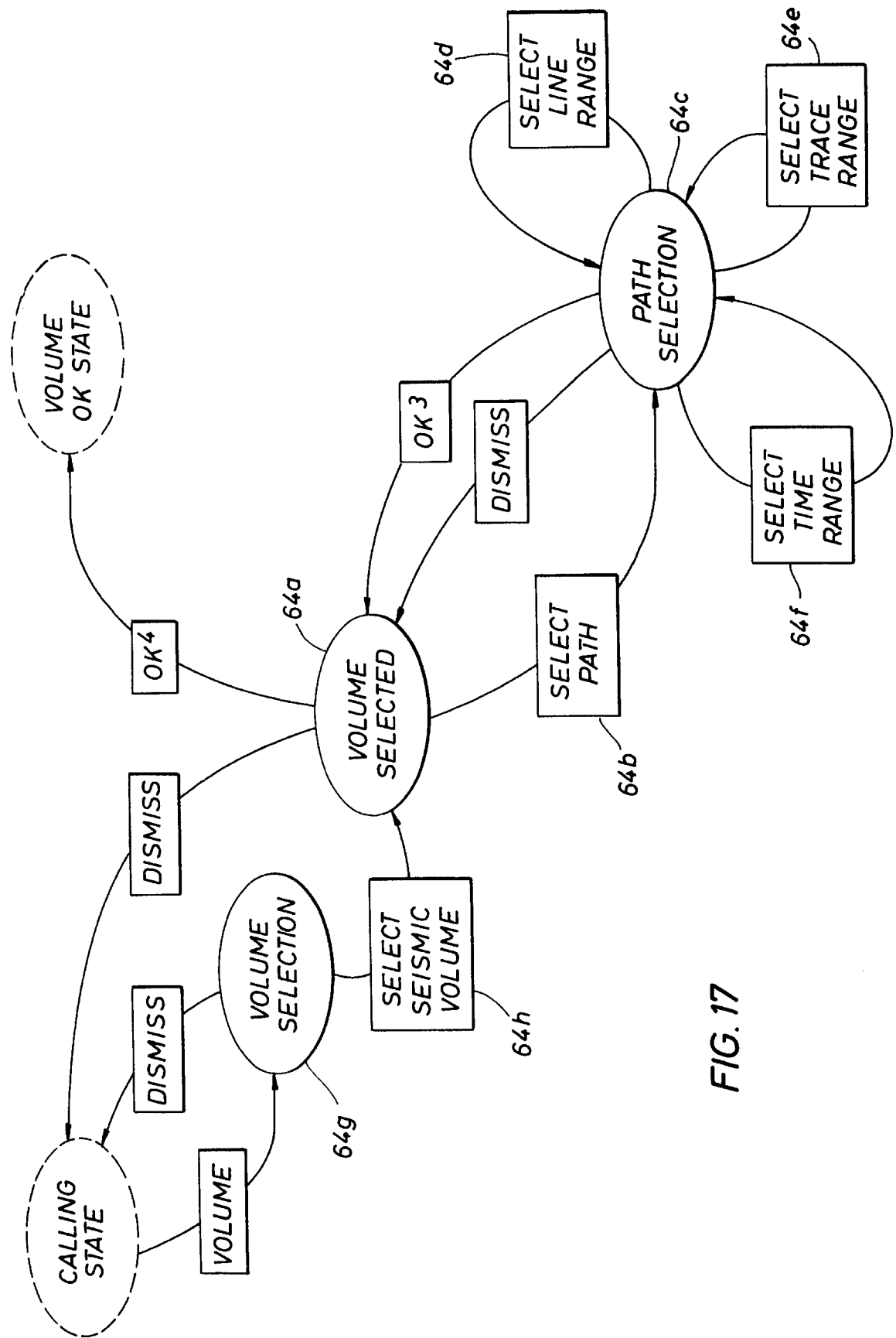

In FIG. 8, if the operator has selected volume 1 60a, as indicated by element numeral 62 in FIG. 8, the volume selection block 64 in FIG. 8 is executed. A detailed construction of the volume selection block 64 is illustrated in FIG. 17. When the volume selection block 64 execution is complete, the primary volume ready block 70 is executed. A detailed construction of the primary volume ready block 70 is illustrated in FIG. 9.

Figure 9:
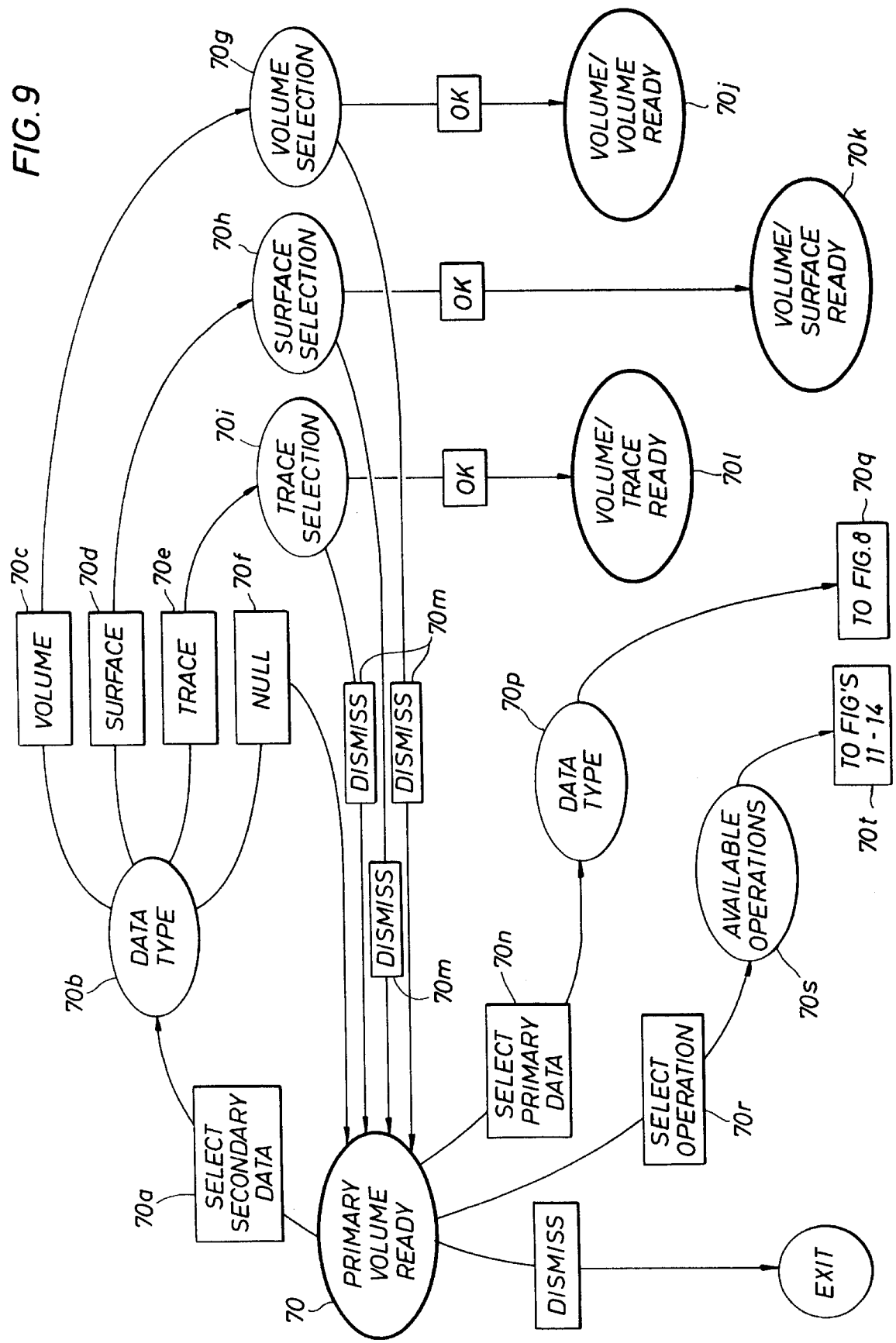
Figure 29:
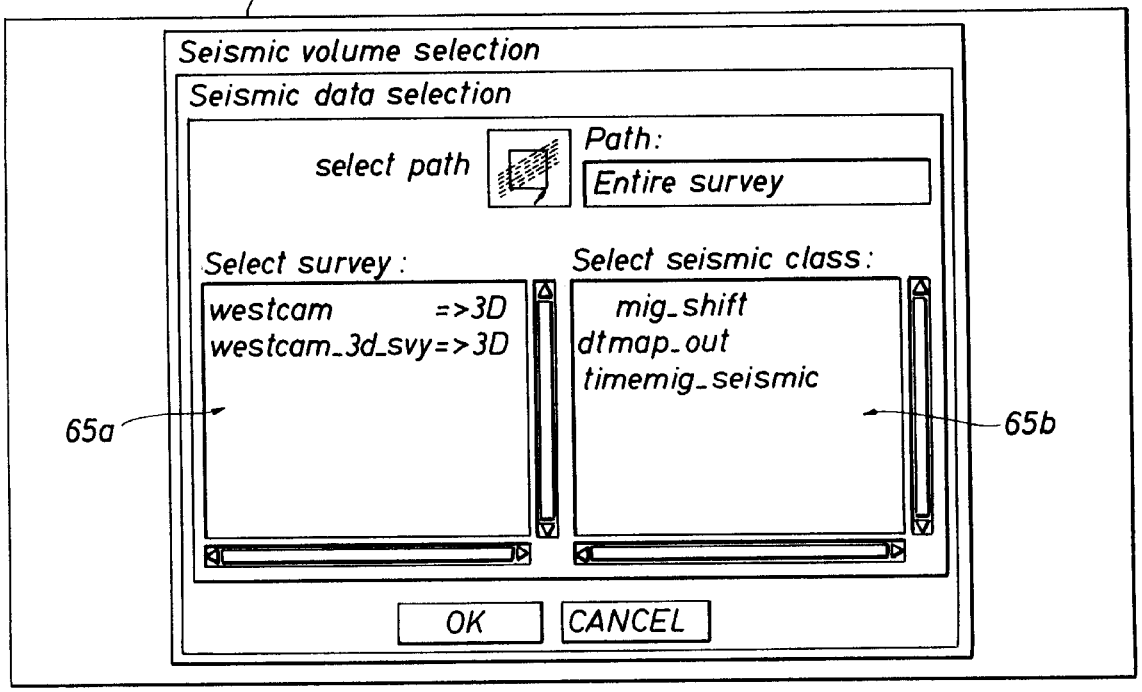

In FIGS. 17 and 29, referring initially to FIG. 17, when the volume selection blocks 64 or 70g of FIGS. 8 or 9, respectively, are each executed, the "volume selection" block 64g of FIG. 17 and the "select seismic volume" block 64h of FIG. 17 have already been executed, and the "volume selected" block 64a in FIG. 17 will be executed. When the "volume selected" block 64a of FIG. 17 is executed, the volume selection window 65 of FIG. 29 is presented to the operator at the workstation 32 display 32a. In FIG. 17, the operator, when using the volume selection window 65 of FIG. 29, will select path 64b which will implement the path selection 64c. Implementation of path selection 64c means that the operator must select line range 64d, select trace range 64e, and select time range 64f.

In FIG. 29, the volume selection window 65 (entitled "seismic volume selection—seismic data selection—select path") includes a first block 65a (entitled "select survey") where the operator will select a seismic survey, and a second block 65b (entitled "select seismic class") where the operator will select a seismic class.

Figure 11:
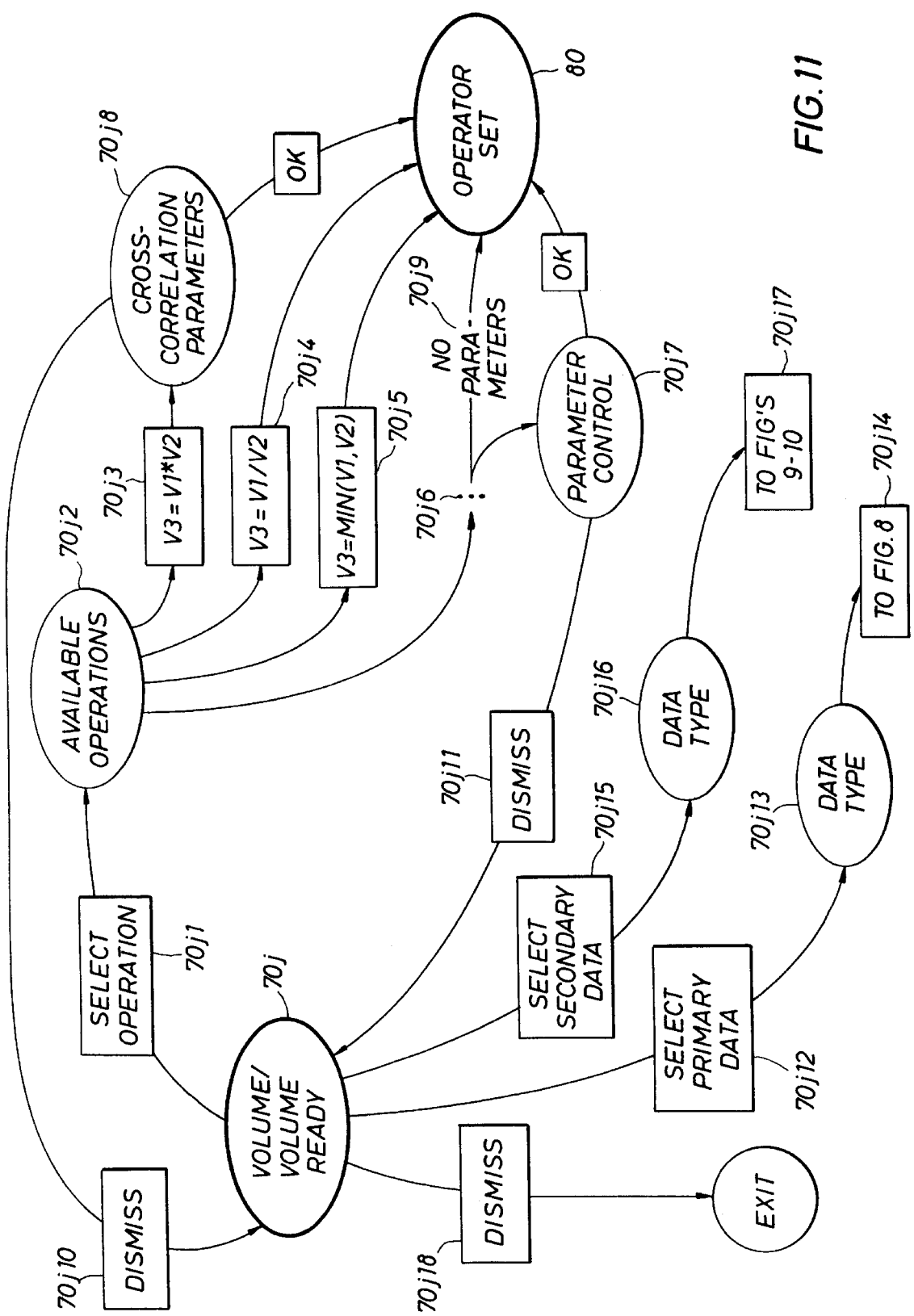
Figure 12:
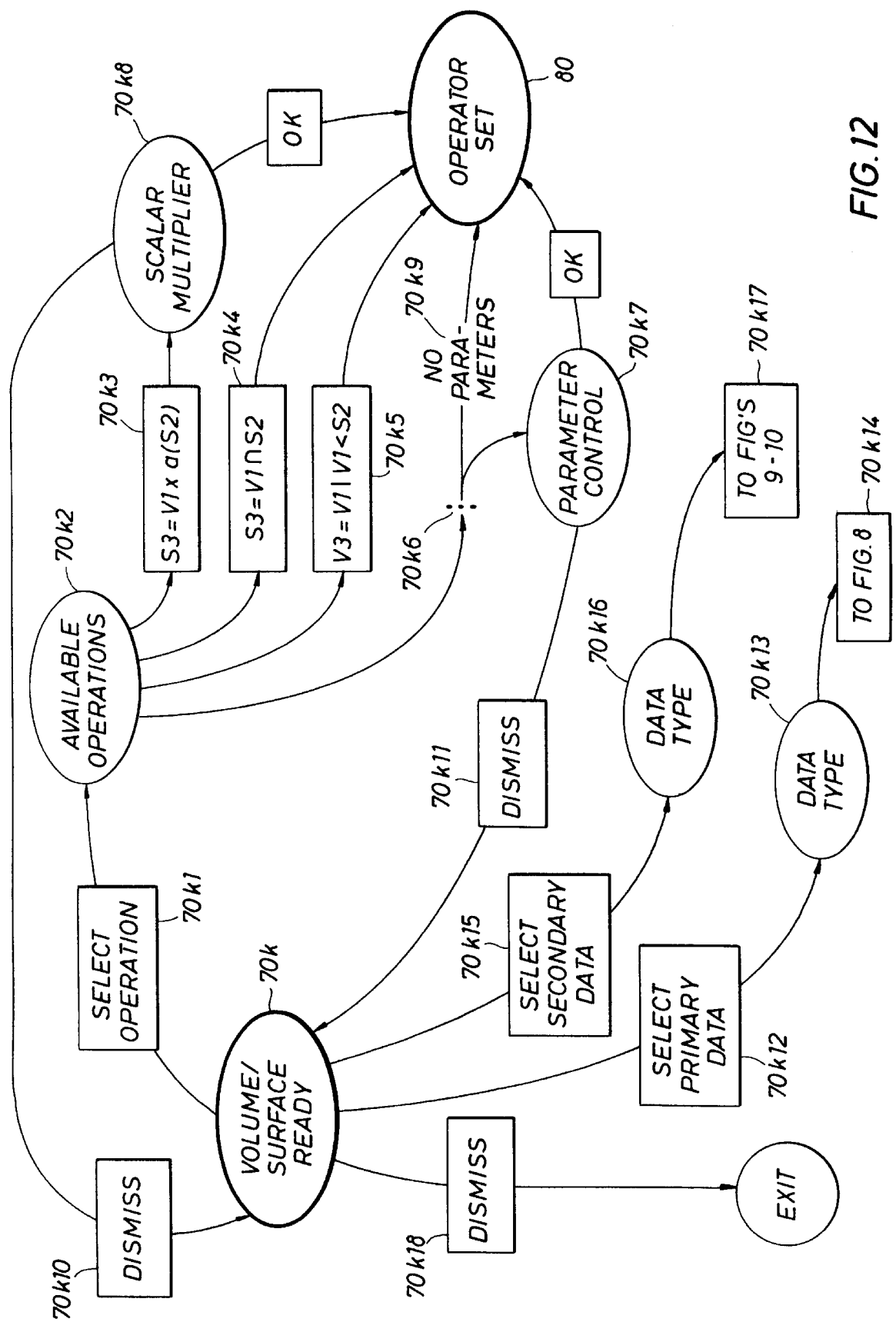
Figure 13:
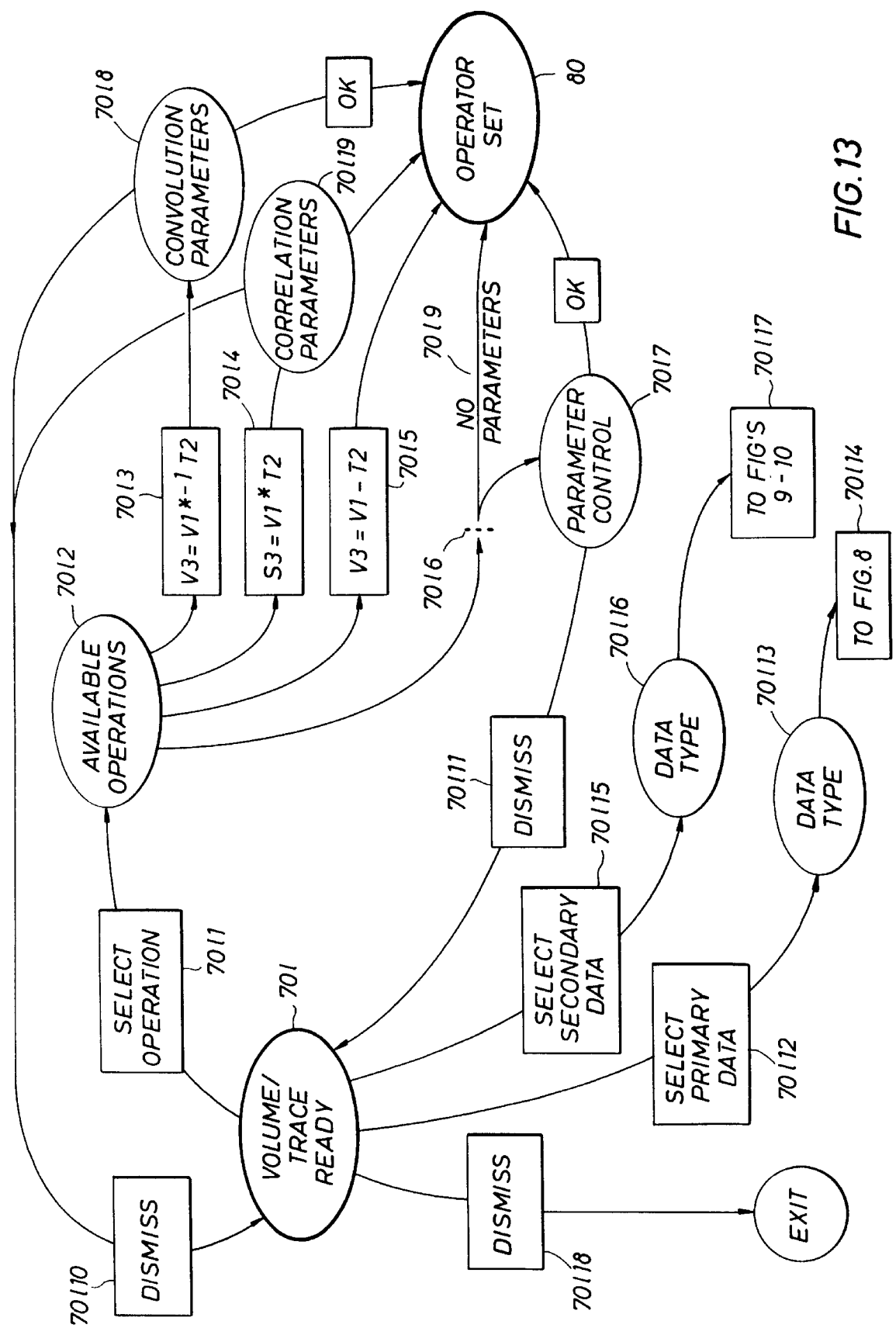
Figure 18:
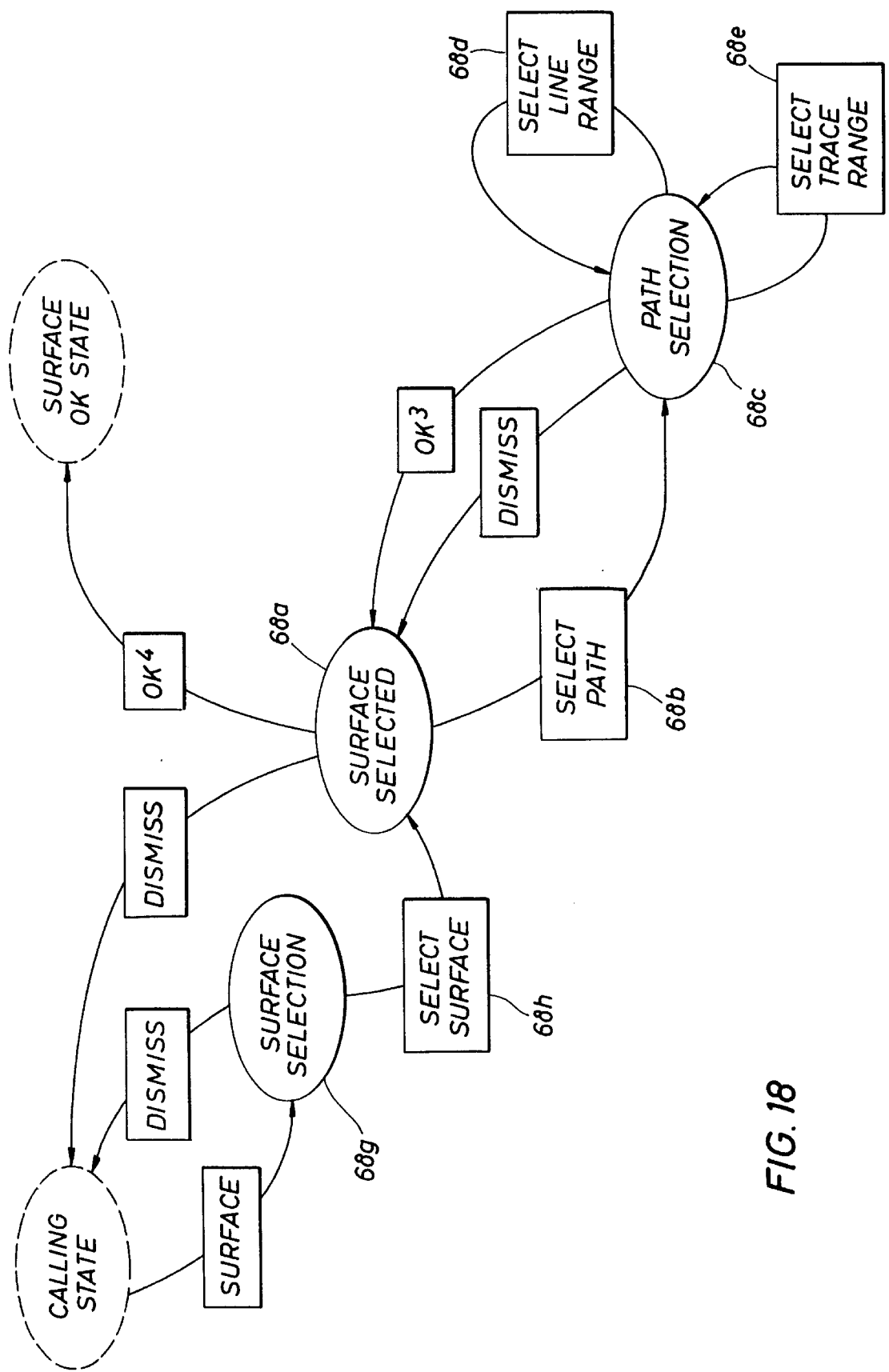
Figure 19:
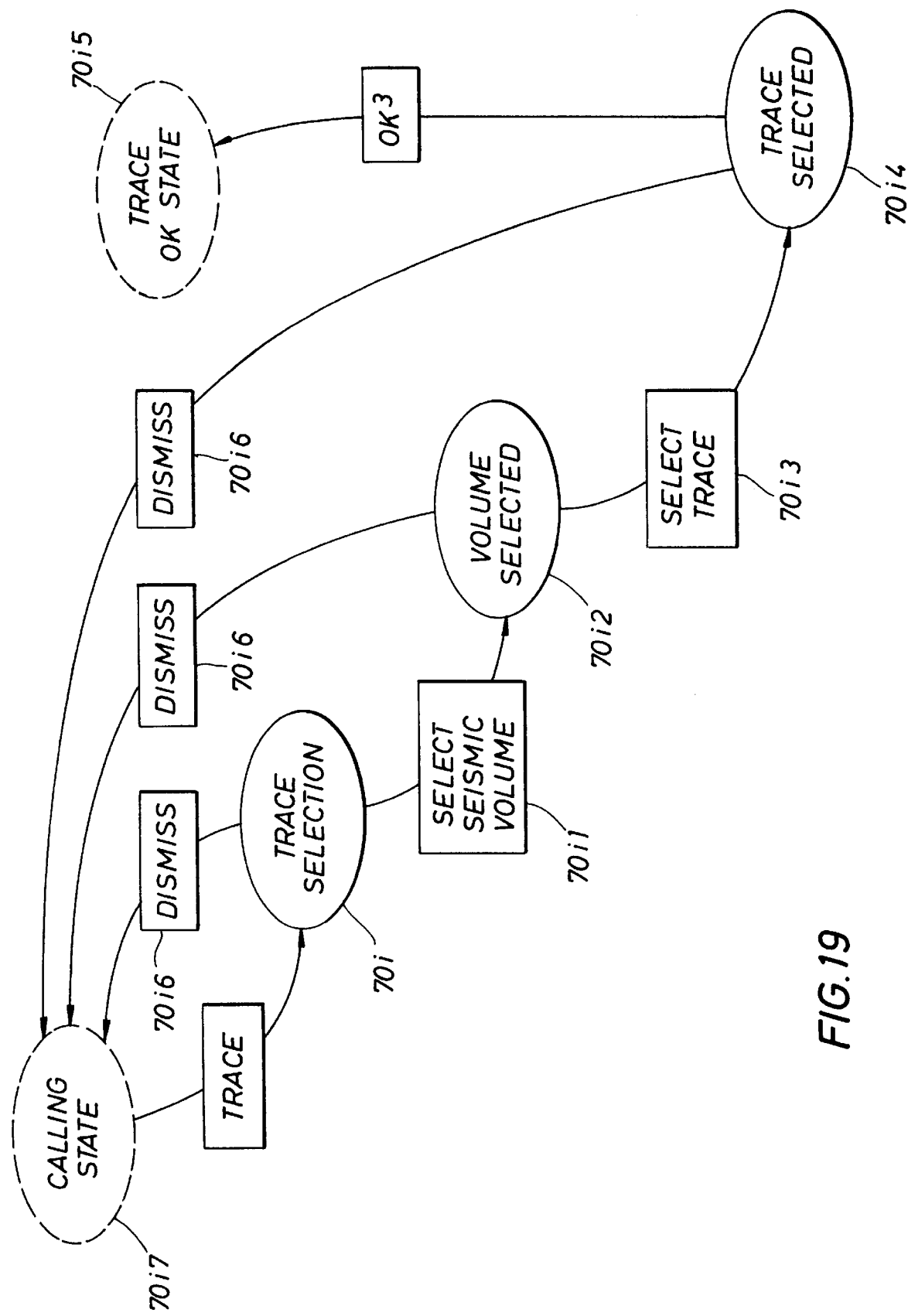
Figure 25:
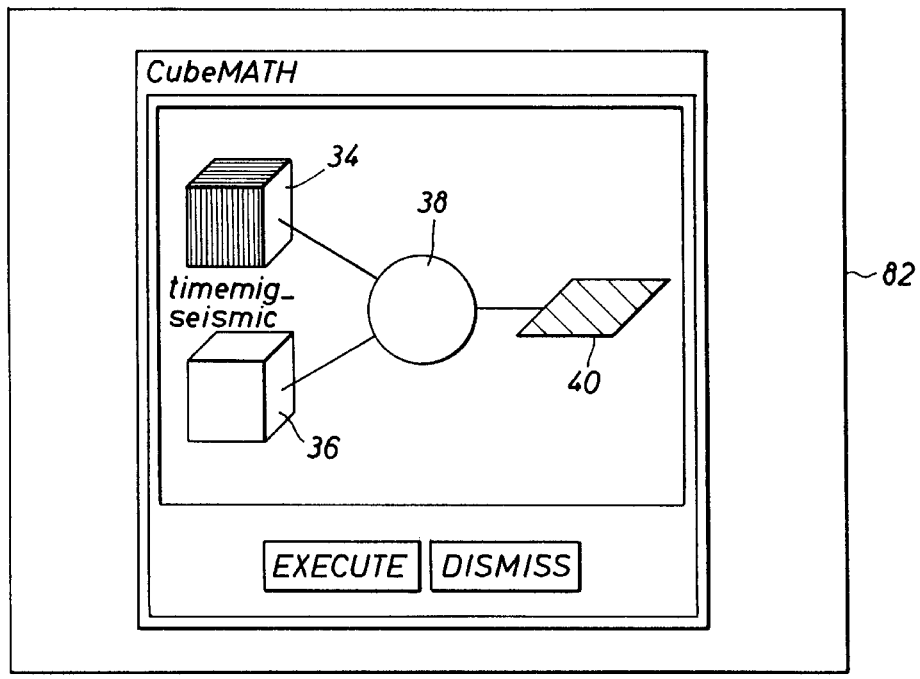

In FIGS. 9, 24, and 25, referring initially to FIG. 9, when the primary volume ready block 70 of FIG. 8 is executed, referring to FIG. 9, the operator at the workstation 32 must select secondary data 70a and then specify a secondary data type 70b. In order to select the secondary data type, referring to FIG. 24, the window display shown in FIG. 24 is presented to the operator. In FIG. 24, the operator moves the cursor to the second cube 36 and clicks on the second cube 36. As a result, in FIG. 24, four selections are available to the operator: volume 2, surface 2, trace, or none. The operator at workstation 32 viewing the display of FIG. 24 will click on and select one of the following: volume 2, surface 2, trace, or none. Referring again to FIG. 9, if the operator selects volume 2, surface 2, or trace from the window display of FIG. 24, the operator will implement and select, respectively, the volume 70c, the surface 70d, or the trace 70e in FIG. 9. If the operator selects "none" in FIG. 24, the operator is executing "null" 70f in FIG. 9, at which point, the code will return to "primary volume ready" 70 and the window display shown in FIG. 25 will be presented to the operator. However, if the volume 70c, the surface 70d, or the trace 70e in FIG. 9 is selected, the code will then execute, in FIG. 9, the volume selection block 70g, the surface selection block 70h, or the trace selection block 70I, respectively. A detailed construction of the volume selection block 70g is shown in FIG. 17. A detailed construction of the surface selection block 70h is shown in FIG. 18. A detailed construction of the trace selection block 70I is shown in FIG. 19. If the code executes, in FIG. 9, the volume selection 70g, the surface selection 70h, or the trace selection 70I, assuming that the code does not dismiss 70M back to primary volume ready 70, the code will subsequently execute the volume/volume ready 70j, the volume/surface ready 70k, or the volume/trace ready 70L, respectively. A detailed construction of the volume/volume ready 70j is shown in FIG. 11. A detailed construction of the volume/surface ready 70k is shown in FIG. 12. A detailed construction of the volume/ trace ready 70L is shown in FIG. 13. FIG. 9 also includes other ancillary blocks which should be mentioned. For example, in FIG. 9, the primary data can be selected via the "select primary data" block 70N (similar to block 56 in FIG. 8), the data type can be selected via the "data type" block 70P (similar to block 58 in FIG. 8), and then the code will loop back to the code shown in FIG. 8 of the drawings. Similarly, a mathematical operation can be selected via the "select operation" block 70R (see "select operation" in FIGS. 11–14), available operations 70S are presented for selection (see "available operations" in FIGS. 11–14), and then the code will loop back to the code shown in FIGS. 11–14.

In FIG. 19, when the trace selection block 70I of FIG. 9 is executed, the "trace selection" block 70I in FIG. 19 involves the selection of a seismic volume 70I1. When the seismic volume is selected 70I2, the operator at workstation 32 of FIG. 6 will select a trace 70I3. When the trace is selected 70I4, the program will loop to the "trace ok state" 70I5, which allows the program to proceed to the calling state. However, at different points during the execution of the trace selection code 70I of FIG. 19, the program can dismiss 70I6 to the "calling state" 70I7, which returns the program back to the state that made the volume selection request.

In FIG. 8, if the operator has selected surface 1 60b (of FIG. 24), as indicated by element numeral 66 in FIG. 8, the surface selection block 68 is executed. A detailed construction of the surface selection block 68 is illustrated in FIG. 18. When the surface selection block 68 execution is complete, the primary surface ready block 72 is executed. A detailed construction of the primary surface ready block 72 is illustrated in FIG. 10.

In FIG. 18, when the surface selection blocks 68 or 70h of FIGS. 8 or 9, respectively, are each executed, the "surface selection" block 68g and the "select surface" 68h of FIG. 18 have already been executed, and the "surface selected" block 68a in FIG. 18 has been executed. In FIG. 18, the operator will select path 68b which will implement the path selection 68c. Implementation of path selection 68c means selecting line range 68d and selecting trace range 68e.

Figure 10:
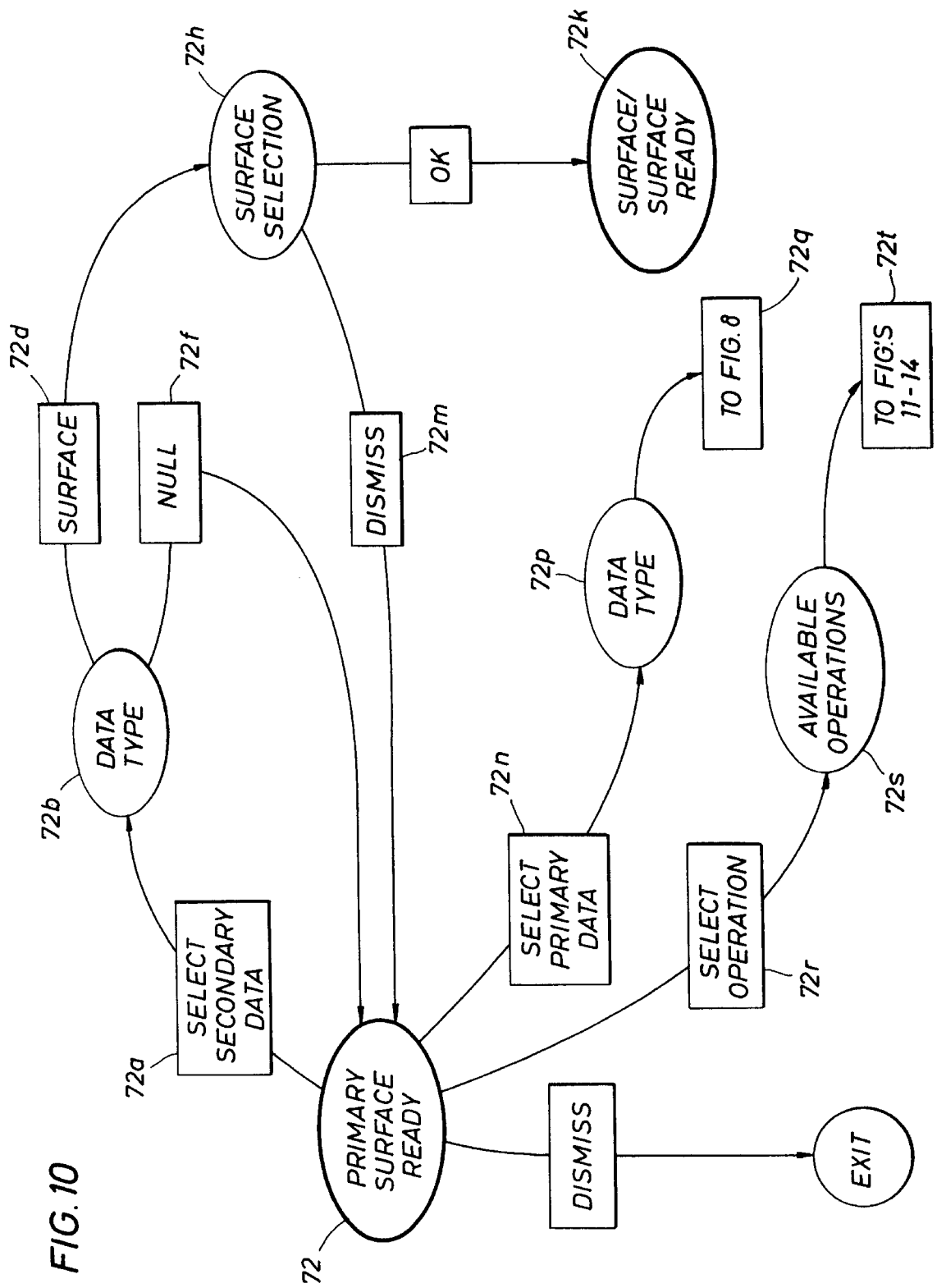

In FIGS. 10 and 24, when the primary surface ready block 72 of FIG. 8 is executed, referring to FIG. 10, the operator at the workstation 32 must select secondary data 72a and then specify a secondary data type 72b. In FIG. 24, to select secondary data, the operator must click on the second cube 36 and then click on the "surface 2". In FIG. 10, when the operator selects "surface 2" (from FIG. 24), the operator has implemented and selected the surface 72d in FIG. 10.

Figure 14:
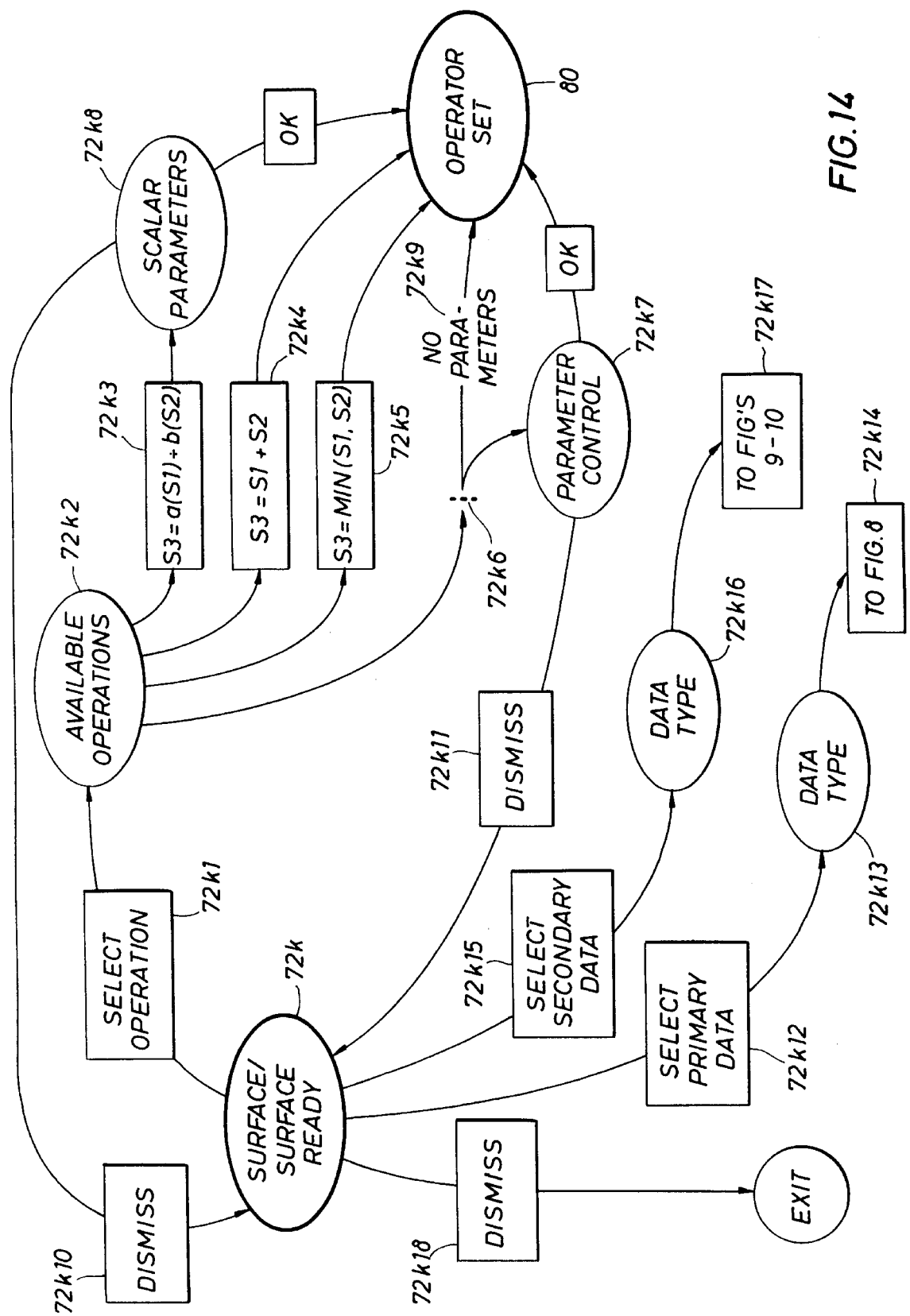

If the operator selects "none" (from FIG. 24), the operator is executing "null" 72f in FIG. 10, at which point, the code will return to "primary surface ready" 72. However, if the surface 72d in FIG. 10 is selected, the code will then execute, in FIG. 10, the surface selection 72h. A detailed construction of the surface selection 72h is shown in FIG. 18. If the code executes, in FIG. 10, the surface selection 72h, assuming that the code does not dismiss 72M back to primary surface ready 72, the code will subsequently execute the surface/surface ready 72k. A detailed construction of the surface/surface ready 72k is shown in FIG. 14. FIG. 10 also includes other ancillary blocks which should be mentioned. For example, in FIG. 10, the primary data can be selected via the "select primary data" block 72N (similar to block 56 in FIG. 8), the data type can be selected via the "data type" block 72P (similar to block 58 in FIG. 8), and then the code will loop back to the code shown in FIG. 8 of the drawings. Similarly, a mathematical operation can be selected via the "select operation" block 72R (see "select operation" in FIGS. 11–14), available operations 72S are presented for selection (see "available operations" in FIGS. 11–14), and then the code will loop back to the code shown in FIGS. 11–14.

The above paragraphs have introduced, in FIG. 9, the "volume/volume ready" 70j, the "volume/surface ready" 70k, and the "volume/trace ready" 70L, and, in FIG. 10, the "surface/surface ready" 72k. The volume/volume ready 70j (of FIG. 11), the volume/surface ready 70k (of FIG. 12), the volume/trace ready 70L (of FIG. 13), and surface/surface ready 72K (of FIG. 14) are all somewhat similar in code construction, and each of these will be discussed in the following paragraphs.

Figure 15:
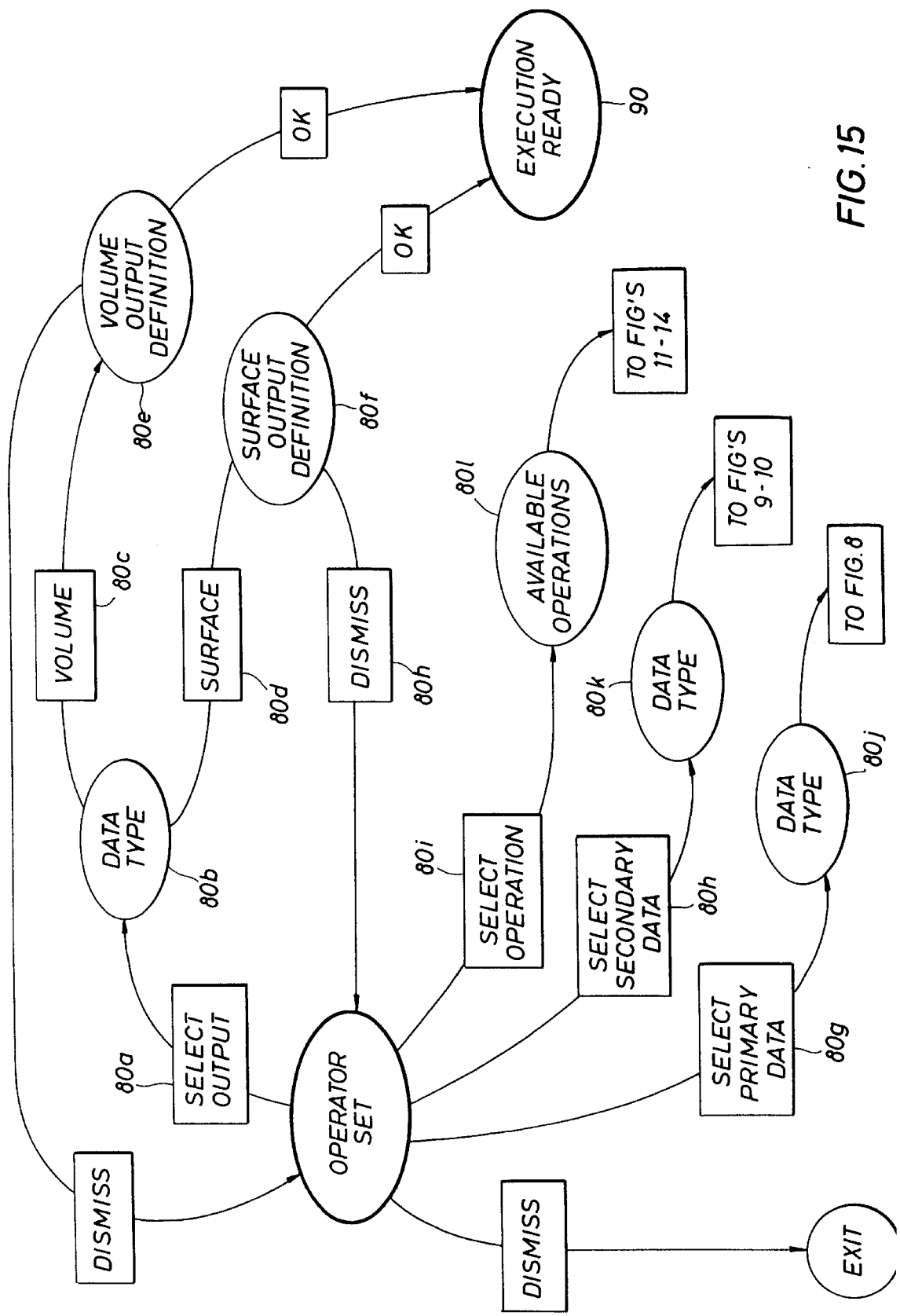
Figure 20:
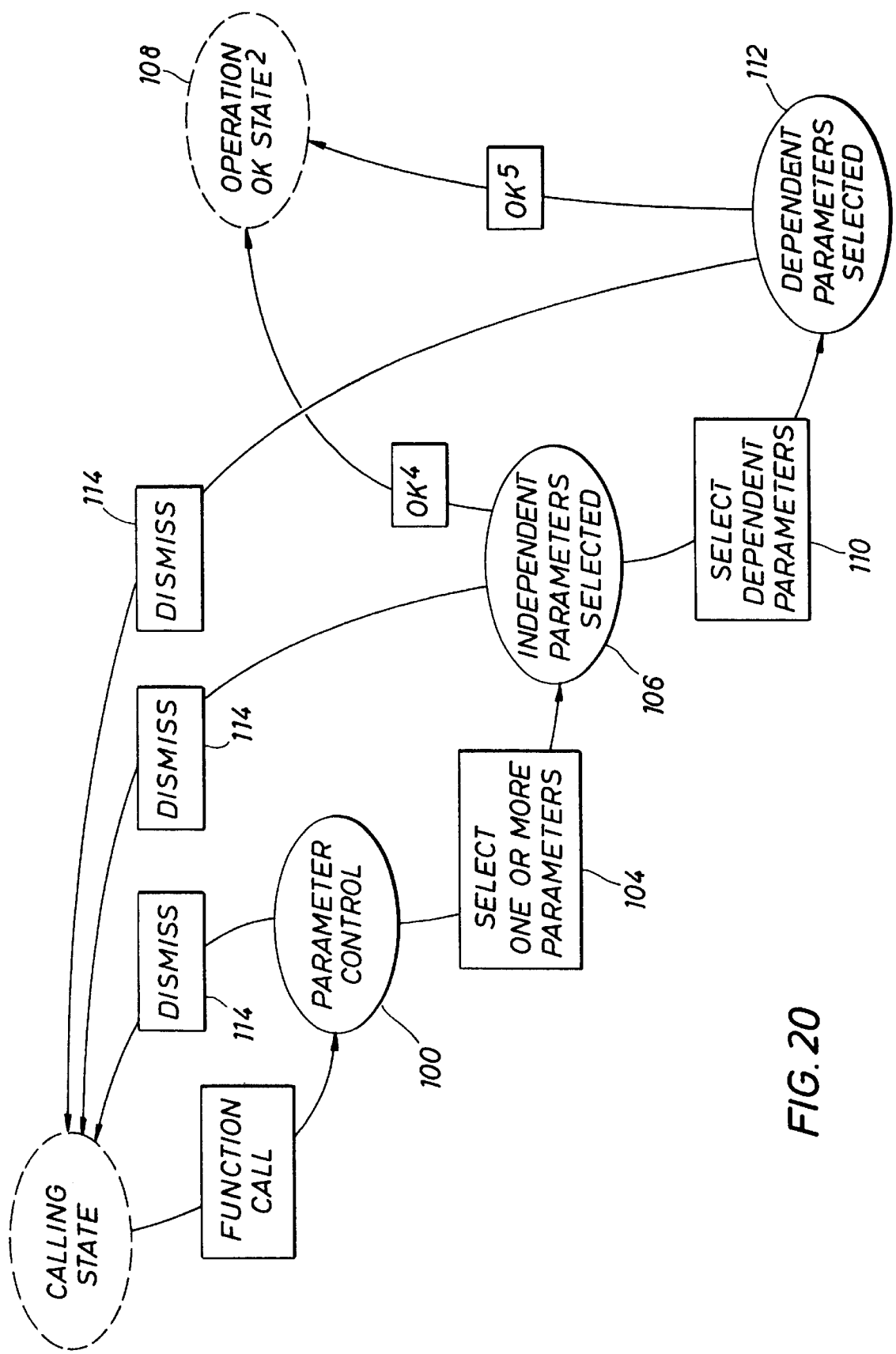

Referring to FIG. 11, the volume/volume ready block 70j allows the operator to select an operation 70j1, and, when an operation 70j1 is selected, a number of available operations 70j2 are presented to the operator. In FIG. 11, at least three mathematical operations are available for selection: a first mathematical operation 70j3 is as follows: V3=V1*V2. The selection of the first mathematical operation 70j3 may involve the further selection of certain cross-correlation parameters 70j8. Alternatively, a second mathematical operation 70j4 is as follows: V3=V1/V2. Still another mathematical operation 70j5 is a follows: V3=Min (V1, V2). Several other mathematical operations 70j6 are also available for selection by the operator. When the other mathematical operations 70j6 are selected by the operator, certain independent and dependent parameters may need to be selected via a parameter control block 70j7. A detailed construction of the parameter control block 70j7 is shown in FIG. 20 of the drawings. On the other hand, the parameters may not need to be selected since no parameters 70j9 are required. When the mathematical operations are selected (one of blocks 70j3, 70j4, 70j5, 70j7, or 70j9 in FIG. 11 have been executed), assuming that the "dismiss" options 70j10 and 70j11 are not selected (dismiss option 70j10 being output from cross correlation parameters 70j8 and dismiss option 70j11 being output from parameter control 70j7), the "operator set" block 80 is will be executed. A detailed construction of the "operator set" block 80 is shown in FIG. 15 of the drawings. However, from the volume/volume ready block 70j of FIG. 11, an operator can also select primary data 70j12 and determine data type 70j13 (select first cube 34 and select volume or surface 60a or 60b in FIG. 24), at which point, the code will loop back to FIGS. 8 of the drawings, 70j14. The operator could select secondary data 70j15 (second cube 36, FIG. 24) and determine data type 70j16 (volume or surface or trace or none, FIG. 24), at which point, the code will loop back to FIGS. 9 and 10 of the drawings, 70j17. Alternatively, from the volume/volume ready block 70j, the operator can dismiss 70j18.

Referring to FIG. 12, the volume/surface ready block 70k allows the operator to select an operation 70k1, and, when an operation 70k1 is selected, a number of available operations 70k2 are presented to the operator. In FIG. 12, at least three mathematical operations are available for selection: a first mathematical operation 70k3 is as follows: S3=V1×aS2. The selection of the first mathematical operation 70k3 may involve the further selection of a scalar multipler 70k8. Alternatively, a second mathematical operation 70k4 is as follows: S3=V1∩S2. Still another mathematical operation 70k5 is a follows: V3=V1|V1<S2. Several other mathematical operations 70k6 are also available for selection by the operator. When the other mathematical operations 70k6 are selected by the operator, certain independent and dependent parameters may need to be selected via a parameter control block 70k7. A detailed construction of the parameter control block 70k7 is shown in FIG. 20 of the drawings. On the other hand, the parameters may not need to be selected since no parameters 70k9 are required. When the mathematical operations are selected (one of blocks 70k3, 70k4, 70k5, 70k7, or 70k9 in FIG. 12 have been executed), assuming that the "dismiss" options 70k10 and 70k11 are not selected (dismiss option 70k10 being output from scalar multiplier block 70k8 and dismiss option 70k11 being output from parameter control 70k7), the "operator set" block 80 is will be executed. A detailed construction of the "operator set" block 80 is shown in FIG. 15 of the drawings. However, from the volume/surface ready block 70k of FIG. 12, an operator can also select primary data 70k12 and determine data type 70k13 (select first cube 34 and select volume or surface 60a or 60b in FIG. 24), at which point, the code will loop back to FIG. 8 of the drawings, 70k14. The operator could select secondary data 70k15 (second cube 36, FIG. 24) and determine data type 70k16 (volume or surface or trace or none, FIG. 24), at which point, the code will loop back to FIGS. 9 and 10 of the drawings, 70k17. Alternatively, from the volume/surface ready block 70k, the operator can dismiss 70k18.

Referring to FIG. 13, the volume/trace ready block 70L allows the operator to select an operation 70L1, and, when an operation 70L1 is selected, a number of available operations 70L2 are presented to the operator. In FIG. 13, at least three mathematical operations are available for selection: a first mathematical operation 70L3 is as follows: V3=V1*$_1$T2. The selection of the first mathematical operation 70L3 may involve the further selection of certain convolution parameters 70L8. Alternatively, a second mathematical operation 70L4 is as follows: V3=V1*T2. The selection of the second mathematical operation 70L4 may involve the further selection of correlation parameters 70L19. Still another mathematical operation 70L5 is a follows:

V3=V1−T2. Several other mathematical operations 70L6 are also available for selection by the operator. When the other mathematical operations 70L6 are selected by the operator, certain independent and dependent parameters may need to be selected via a parameter control block 70L7. A detailed construction of the parameter control block 70L7 is shown in FIG. 20 of the drawings. On the other hand, the parameters may not need to be selected since no parameters 70L9 are required. When the mathematical operations are selected (one of blocks 70L3, 70L4, 70L5, 70L7, or 70L9 in FIG. 13 have been executed), assuming that the "dismiss" options 70L10 and 70L11 are not selected (dismiss option 70L10 being output from convolution parameters 70L8 and correlation parameters 70L19 and dismiss option 70L11 being output from parameter control 70L7), the "operator set" block 80 is will be executed. A detailed construction of the "operator set" block 80 is shown in FIG. 15 of the drawings. However, from the volume/trace ready block 70L of FIG. 13, an operator can also select primary data 70L12 and determine data type 70L13 (select first cube 34 and select volume or surface 60a or 60b in FIG. 24), at which point, the code will loop back to FIGS. 8 of the drawings, 70L14. The operator could select secondary data 70L15 (second cube 36, FIG. 24) and determine data type 70L16 (volume or surface or trace or none, FIG. 24), at which point, the code will loop back to FIGS. 9 and 10 of the drawings. Alternatively, from the volume/trace ready 70L, the operator can dismiss 70L18.

Referring to FIG. 14, the surface/surface ready block 72k allows the operator to select an operation 72k1, and, when an operation 72k1 is selected, a number of available operations 72k2 are presented to the operator. In FIG. 14, at least three mathematical operations are available for selection: a first mathematical operation 72k3 is as follows: S3=a(S1)/b(S2). The selection of the first mathematical operation 72k3 may involve the further selection of scalar parameters 72k8. Alternatively, a second mathematical operation 72k4 is as follows: S3=S1+S2. Still another mathematical operation 72k5 is a follows: S3=Min (S1, S2). Several other mathematical operations 72k6 are also available for selection by the operator. When the other mathematical operations 72k6 are selected by the operator, certain independent and dependent parameters may need to be selected via a parameter control block 72k7. A detailed construction of the parameter control block 72k7 is shown in FIG. 20 of the drawings. On the other hand, the parameters may not need to be selected since no parameters 72k9 are required. When the mathematical operations are selected (one of blocks 72k3, 72k4, 72k5, 72k7, or 72k9 in FIG. 14 have been executed), assuming that the "dismiss" options 72k10 and 72k11 are not selected (dismiss option 72k10 being output from scalar parameters block 72k8 and dismiss option 72k11 being output from parameter control 72k7), the "operator set" block 80 is will be executed. A detailed construction of the "operator set" block 80 is shown in FIG. 15 of the drawings. However, from the surface/surface ready block 72k of FIG. 14, an operator can also select primary data 72k12 and determine data type 72k13 (select first cube 34 and select volume or surface 60a or 60b in FIG. 24), at which point, the code will loop back to FIG. 8 of the drawings, 72k14. The operator could select secondary data 72k15 (second cube 36, FIG. 24) and determine data type 72k16 (volume or surface or trace or none, FIG. 24), at which point, the code will loop back to FIGS. 9 and 10 of the drawings, 72k17. Alternatively, from the surface/surface ready block 72k, the operator can dismiss, 72k18.

Figure 32:
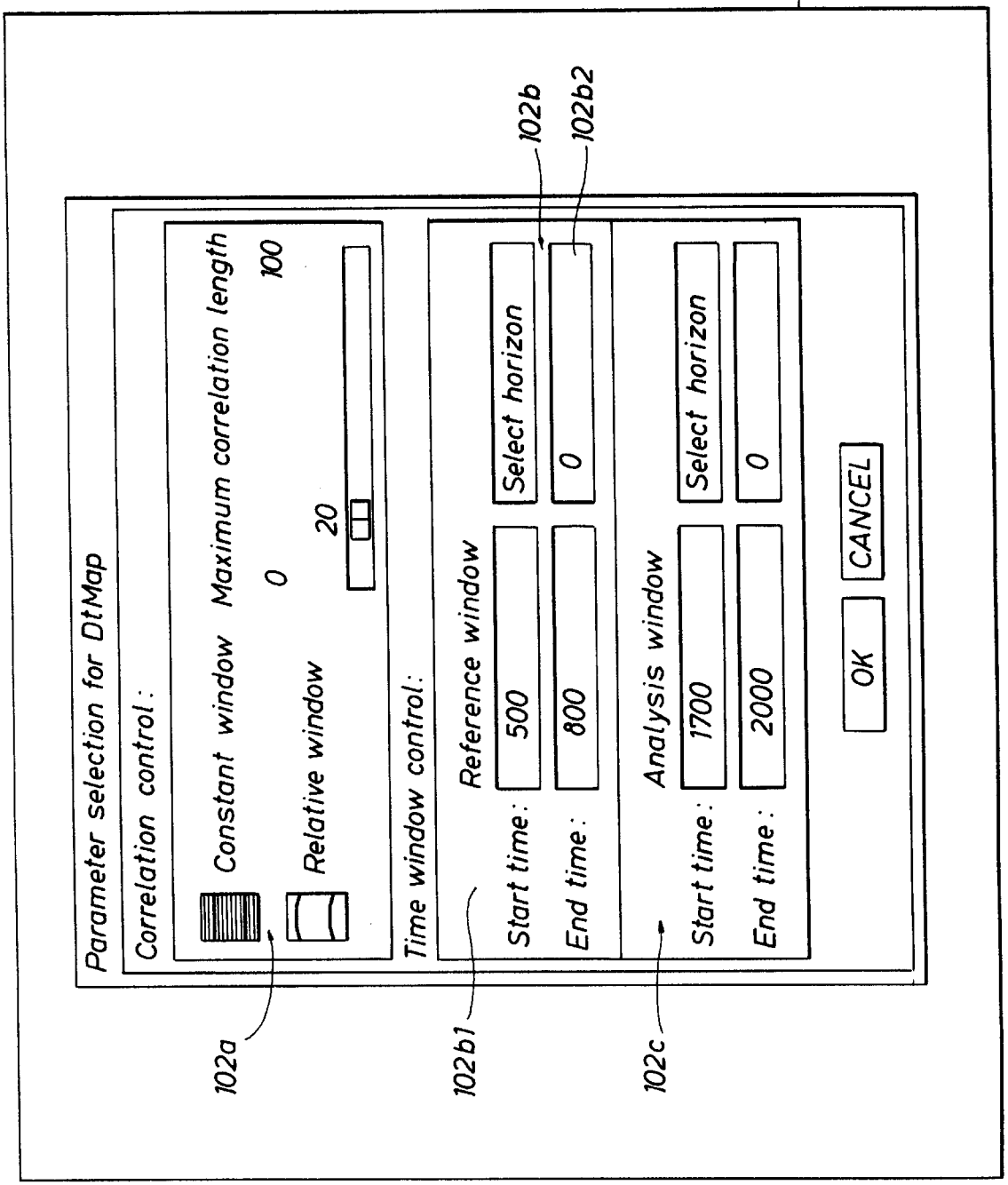

Referring to FIGS. 20 and 32, a detailed construction of the parameter control block 70j7 of FIG. 11, the parameter control block 70k7 of FIG. 12, the parameter control block 70L7 in FIG. 13, and the parameter control block 72K7 in FIG. 14 is illustrated.

In FIGS. 20 and 32, referring initially to FIG. 20, execution of the parameter control block 100 will call up the window display 102 shown in FIG. 32 of the drawings. The parameter control block 100 in FIG. 20 appeared as parameter control blocks 70j7, 70k7, 70L7, and 72K7 in FIGS. 11 through 14, respectively.

In FIG. 32, the window display 102, entitled "Parameter selection for DtMap"—"correlation control", includes operator controls 102a (which appear under the heading "correlation control"), and surface definition 102b, and seismic window definition 102c (which appear under the heading "time window control"). The surface definition 102b includes a "reference window—start time—end time" 102b1 and a "select horizon—end time" 102b2.

In FIG. 20, from the parameter control block 100, the operator at workstation 32 would select one or more parameters 104, at which point, independent parameters have been selected 106. The program can proceed, at this point, to the operation ok state 108, which allows the program to proceed to the calling state. However, the operator can select dependent parameters 110, at which point, the dependent parameters have been selected 112. The program can now proceed to the operation ok state 108. However, the operator at workstation 32 can dismiss 114 to the calling state at different times during the program execution, the calling state returning to the state that made the volume selection request.

Figure 26:
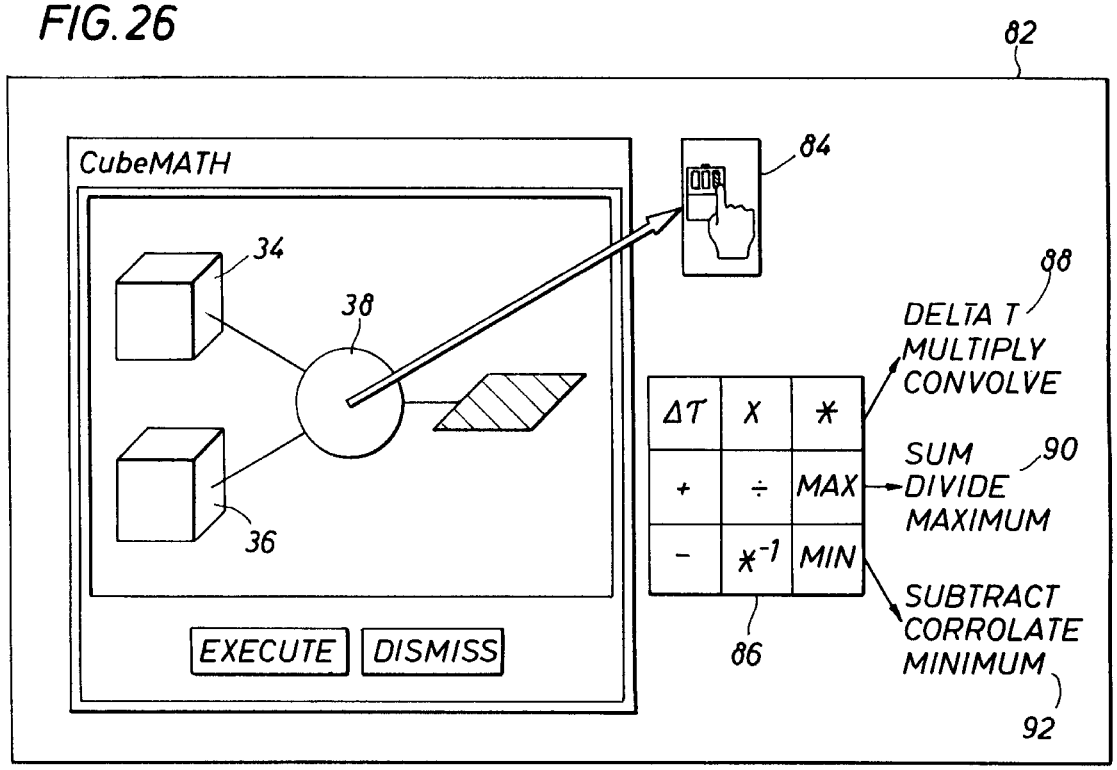

Referring to FIGS. 25 and 26, a window display 82 is illustrated. This window display 82 will appear on the display 32a of the interpretation workstation 32 of FIG. 6 during the execution of the volume/volume ready code 70j1 through 70j18 shown in FIG. 11, the volume/surface ready code 70k1 through 70k18 in FIG. 12, the volume/trace ready code 70L1 through 70L18 in FIG. 13, and surface/surface ready code 72k1–72k18 in FIG. 14 of the drawings.

In FIG. 25, in window display 82, when the primary data is selected, the operator will click on the first cube 34. When the secondary data is selected, the operator will click on the second cube 36. Then, the operator will select a mathematical operation by clicking on the "select operation" icon 38. When the primary data from first cube 34 is mathematically operated on the secondary data from second cube 36 using the mathematical operation of icon 38, a predetermined, selected, output 40 is the generated for use by the geoscientist in determining the nature or characterisitics of the earth formation.

In FIG. 26, examples of the mathematical operation selected by clicking on the icon 38 in window display 82 is illustrated. In FIG. 26, when the operator clicks on the icon 38, by using a mouse 84, a plurality of mathematical operation 86 are presented to the operator. Using the mouse 84, the operator will click on only one (1) of the mathematical operations 86 to select one particular mathematical operation. For example, element numeral 88 (which points to "*") would indicate the selection of the "convolve" operation", numeral 90 (which points to "Max") would indicate the selection of the "maximum" operation, and numeral 92 (which points to "Min") would indicate the selection of the "Minimum" operation.

Referring to FIGS. 15, 21, 22, 27, 30 and 31, a detailed construction of the "operator set" code 80, referred to in FIGS. 11 through 14 of the drawings, is illustrated.

In FIG. 15, the operator set code 80 is used to select a particular output, such as a volume output or a surface output, prior to executing the mathematical operation which has already been selected in FIGS. 11–14 of the drawings. In FIG. 15, from "operator set" 80, the operator sitting at the workstation 32 of FIG. 6 will select an output 80a and then select a data type 80b.

Figure 27:
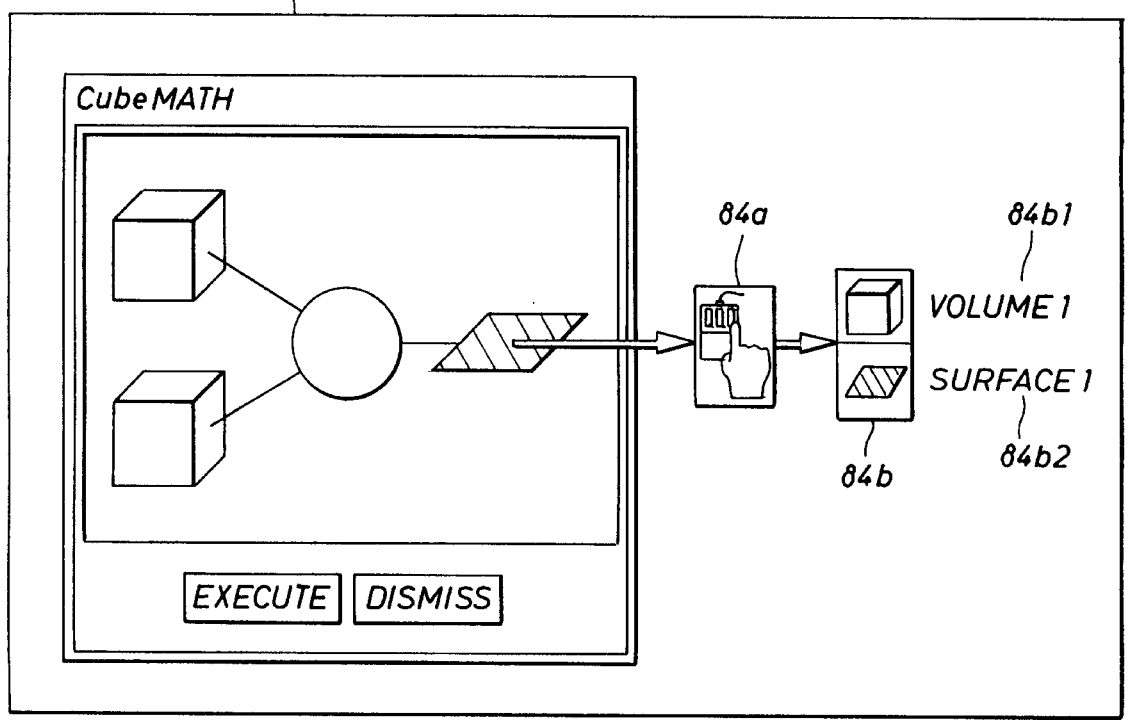

In FIG. 27, a window display 84 will be presented to the operator at the workstation display 32a. Using the mouse 84a, the operator will select a particular output 84b, that is, either a volume 1 output 84b1 or a surface 1 output 84b2.

Figure 21:
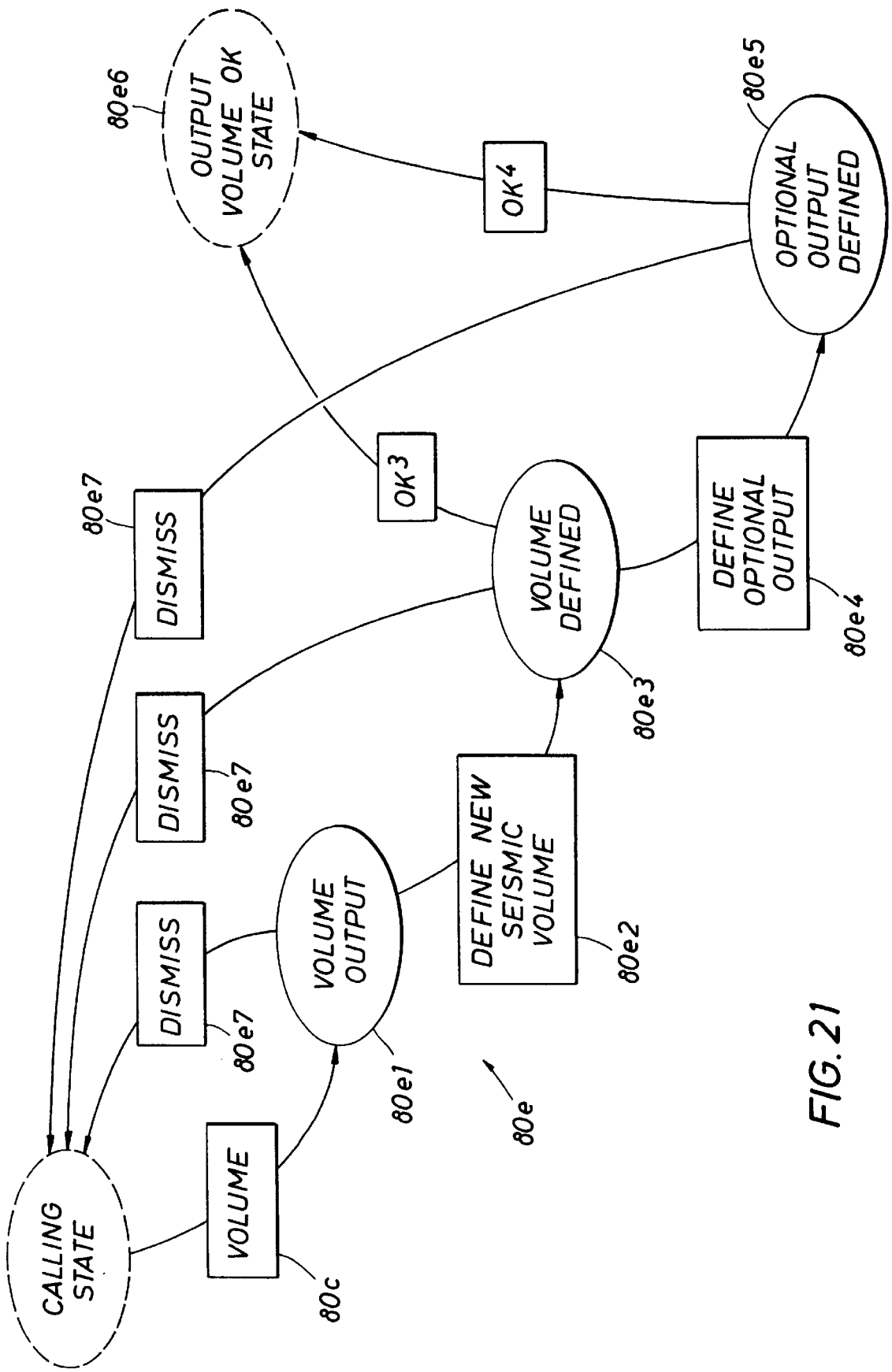
Figure 22:
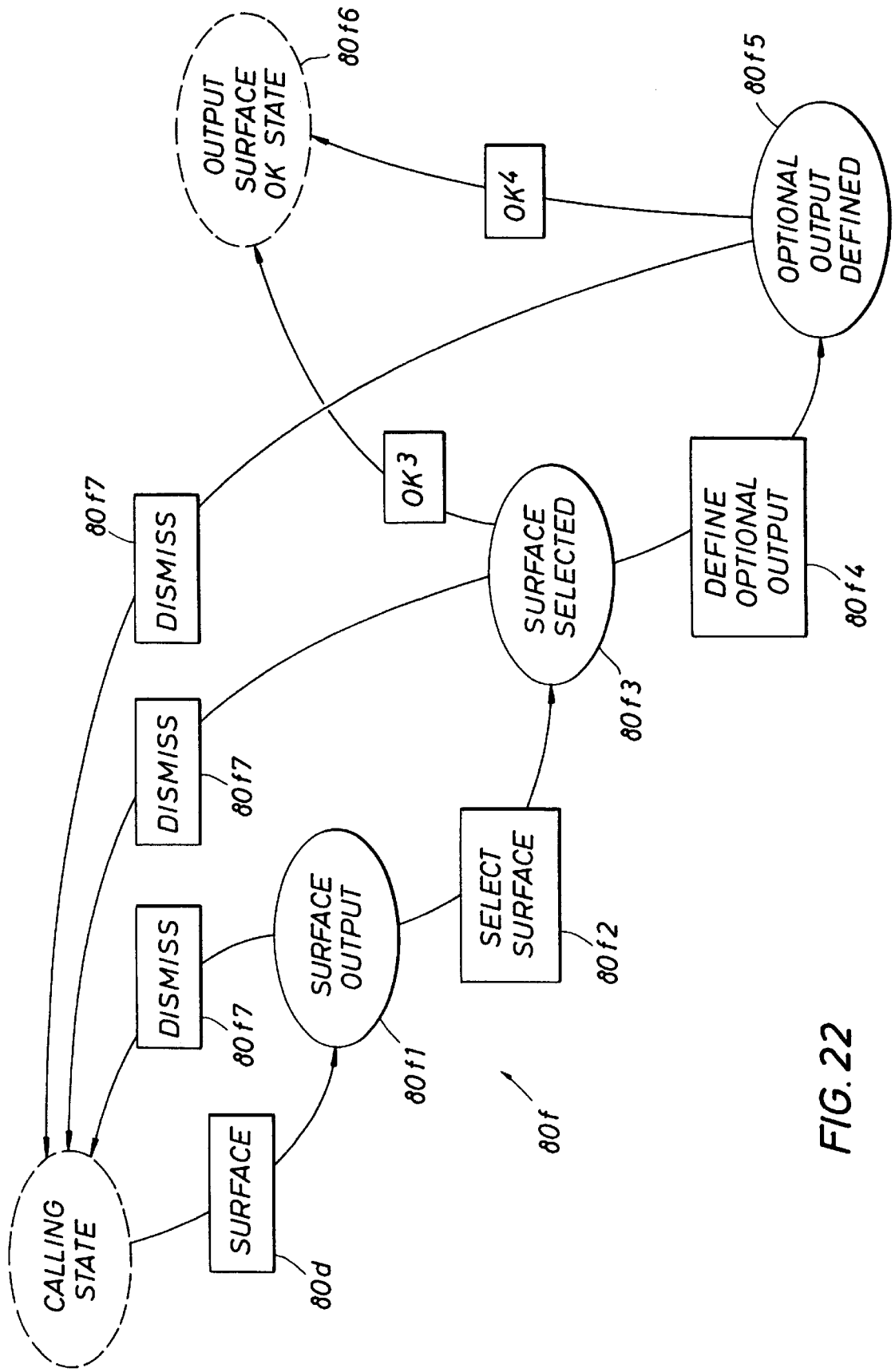

In FIG. 15, the operator selects either the volume output 80c or the surface output 80d. If the operator selects the volume output 80c, the volume output definition code 80e will be executed. A detailed construction of the volume output definition code 80e is shown in FIG. 21 of the drawings. However, if the operator selects the surface output 80d, the surface output definition code 80f will be executed. A detailed construction of the surface output definition code 80f is shown in FIG. 22 of the drawings. When the volume output definition cod 80e is executed, or when the surface output definition code 80f is executed, the program is now "execution ready" 90. However, from "operator set" 80, the operator sitting at the workstation 32 can still select primary data 80g, select secondary data 80h, and select a mathematical operation 80I. When the primary data 80g is selected, the data type 80j is selected (FIG. 24) and then the program loops back to the code shown in FIG. 8 of the drawings. When the secondary data 80h is selected, the data type 80k is selected (FIG. 24) and then the program loops back to the code shown in FIGS. 9–10 of the drawings. When the mathematical operation 80I is specified, the available mathematical operations 80L are specified, and then the program loops back to the code shown in FIGS. 11–14 of the drawings.

Figure 30:
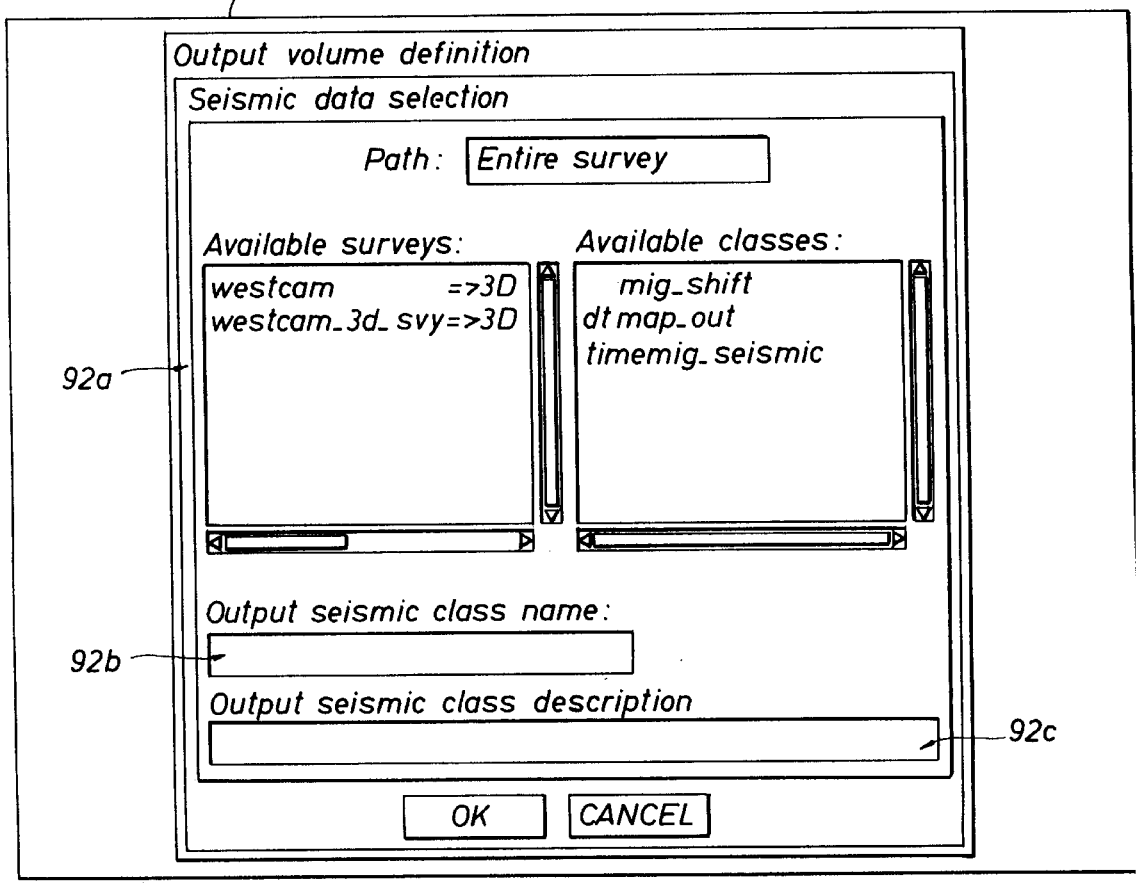

In FIG. 21, when the volume data type 80c is selected in FIG. 15, the volume output definition code 80e, shown in FIG. 21, will generate a volume output 80e1 on a window display 92 of the display 32a of the workstation 32 of FIG. 6. The window display 92 is shown in FIG. 30 of the drawings. The operator will define a new seismic volume 80e2, and, when the new seismic volume 80e2 is defined, the volume defined block 80e3 is executed. When the volume defined block 80e3 is executed, the specified volume output definition will be shown in the volume output window display 92 appearing on the display 32a of the workstation 32. The window display 92 is shown in FIG. 30. After the volume defined block 80e3 is executed, the operator at the workstation 32 can alternatively define another optional output 80e4, at which point, the optional output is defined 80e5. In any case, when either the volume defined block 80e3 is executed, or when the optional output defined block 80e5 is executed, the operator at the workstation 32 can exit to the "output volume ok state" 80e6, which proceeds to the calling state. Of course, the operator at workstation 32 can execute "dismiss" 80e7 to the calling state (return to state that made the volume selection request) at any point when the volume output definition code 80e is being executed.

In FIG. 30, the volume output 80e1, 80e3 window display 92 (entitled "output volume definition") is illustrated. In FIG. 30, the window display 92 includes an informational section 92a (available surveys, available classes), a required class name 92b (output seismic class name), and an optional description 92c (output seismic class description).

Figure 31:
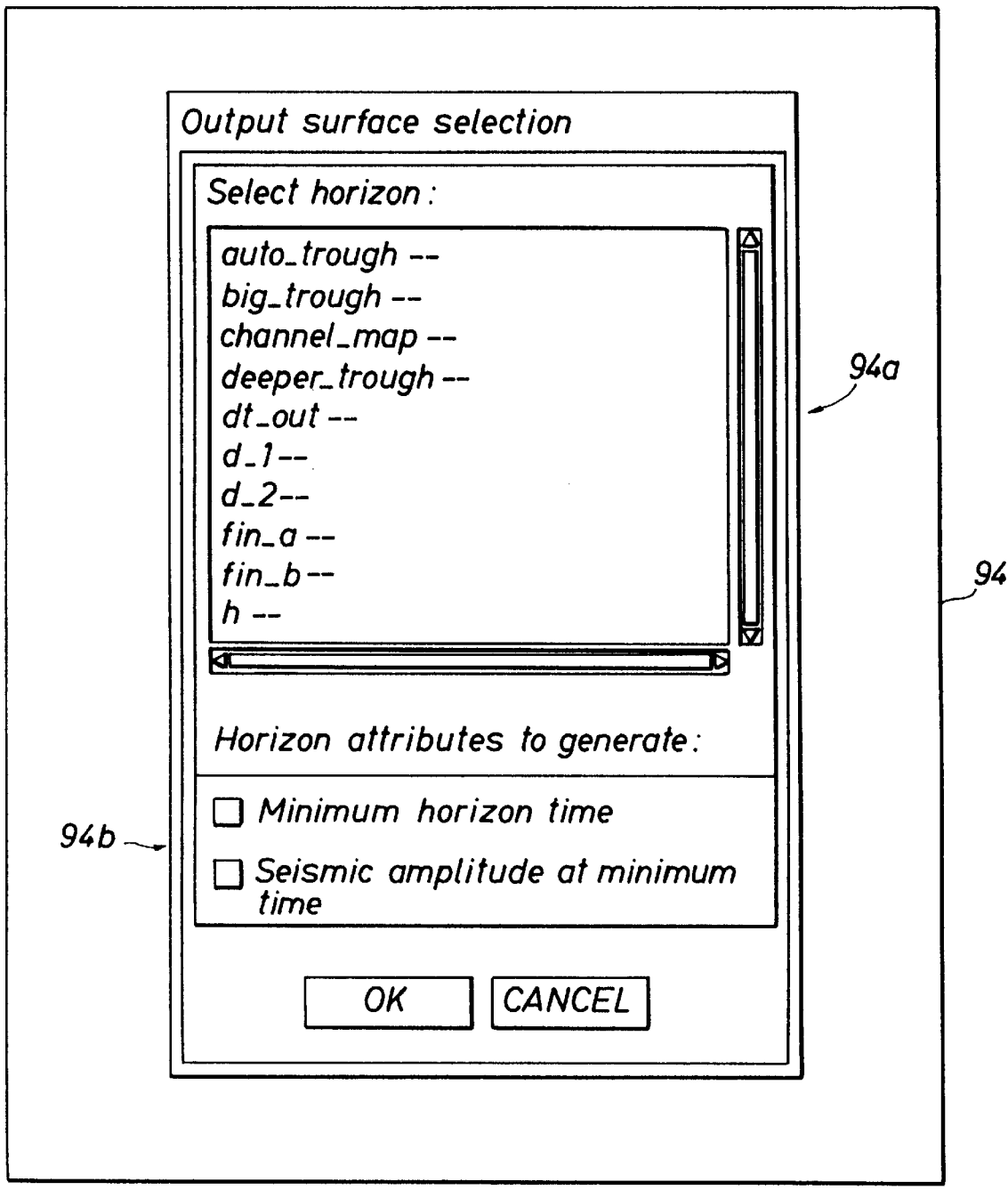

In FIG. 22, when the surface data type 80d is selected in FIG. 15, the surface output definition code 80f, shown in FIG. 22, will generate a surface output 80f1 on a window display 94 of the display 32a of the workstation 32 of FIG. 6. The window display 94 is shown in FIG. 31 of the drawings. The operator will select a new seismic surface 80f2, and, when the new seismic surface 80f2 is selected, the surface selected block 80f3 is executed. When the surface selected block 80f3 is executed, the specified surface output definition will be shown in the surface output window display 94 appearing on the display 32a of the workstation 32. The window display 94 is shown in FIG. 31. After the surface selected block 80f3 is executed, the operator at the workstation 32 can alternatively define another optional output 80f4, at which point, the optional output is defined 80f5. In either case, when either the surface selected block 80f3 is executed, or when the optional output defined block 80f5 is executed, the operator at the workstation 32 can exit to the "output surface ok state" 80f6. Of course, the operator at workstation 32 can execute "dismiss" 80f7 at any point when the surface output definition code 80f is being executed.

In FIG. 31, the surface output 80f1, 80f3 window display 94 (entitled "output surface selection") is illustrated. In FIG. 31, the window display 94 includes a surface selection block 94a (select horizon) and surface output options 94b (horizon attributes to generate—minimum horizon time, seismic amplitude at minimum time).

Figure 16:
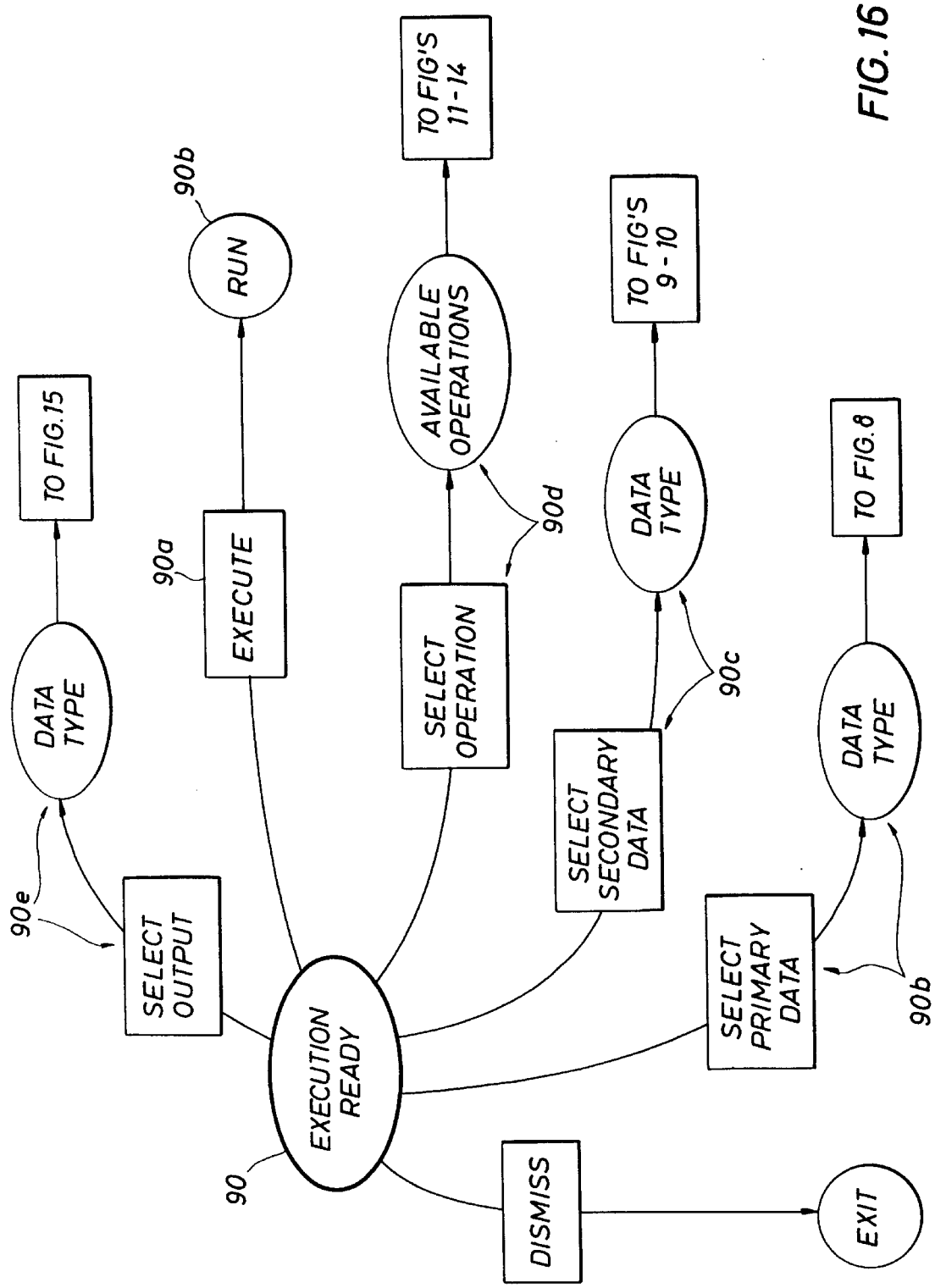
Figure 28:
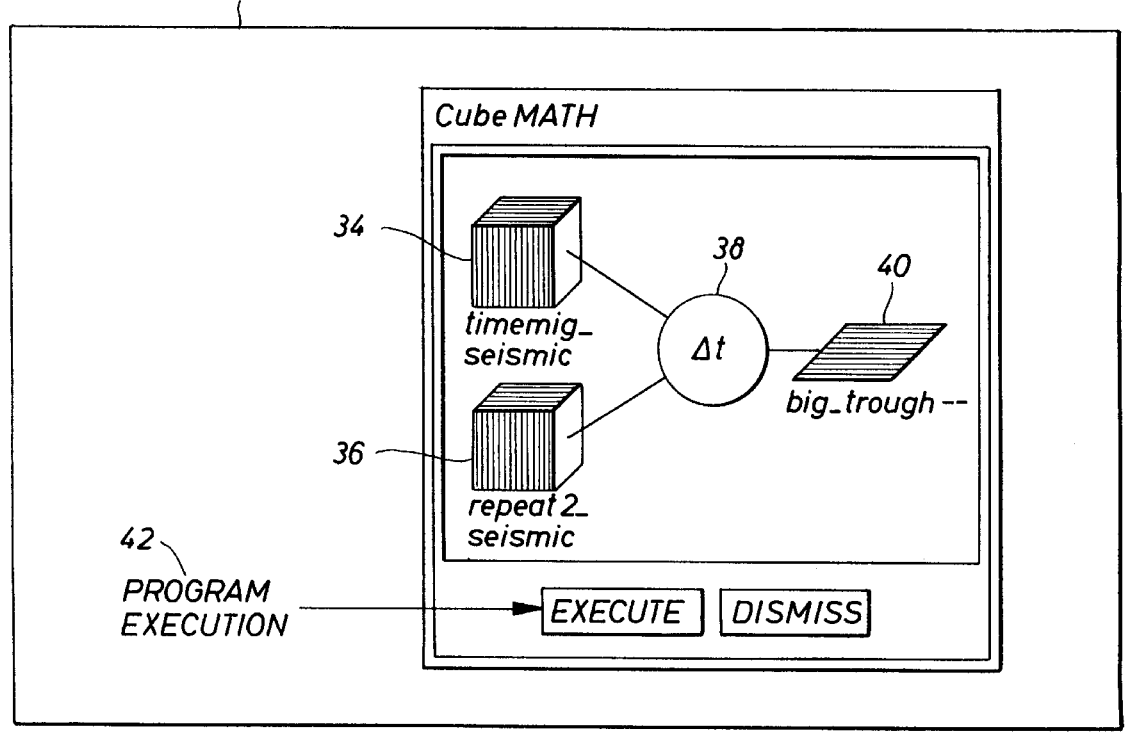

Referring to FIGS. 16 and 28, a detailed construction of the "execution ready" code 90, referred to in FIG. 15, is illustrated.

In FIGS. 16 and 28, referring initially to FIG. 16, when the "execution ready" code 90 of FIG. 15 is executed, the operator will see the window display 98 (shown in FIG. 28) in display 32a of the workstation 32 of FIG. 6, and, by depressing the "execute" button 42 in FIG. 28, the "execute" code 90a in FIG. 16 will begin program execution. The program will run 90b whereupon, in FIG. 28, the first cube 34 of data (representing 3D seismic data obtained at time "t1") will be mathematically operated on the second cube 36 of data (representing 3D seismic data obtained at time "t2"), using the mathematical operation 38, to generate a particular output 40. Of course, in FIG. 16, the operator at workstation 32 can repeat the aforementioned procedures described in the above paragraphs, by selecting primary data and data type 90b (program loops to the code of FIG. 8), selecting secondary data and data type 90c (program loops to code of FIGS. 9–10), selecting operation and available operations 90d (program loops to code of FIGS. 11–14), and selecting output and data type 90e (program loops to code of FIG. 15), at which point, the operator would perform the execute 90a operation in FIG. 16 and the program will run 90b.

Referring to FIGS. 33–35, two examples of the particular output 40 of FIG. 23 is illustrated.

FIG. 33 illustrates a typical input used in the following mathematical operation: Vo=V1*V1, where FIG. 33 illustrates the V1 parameter.

FIG. 34 illustrates a typical "particular output" 40 in FIG. 23 and represents the Vo parameter from the mathematical operation Vo=V1*V1 referenced in FIG. 33.

FIG. 35 illustrates another typical "particular output" 40 of FIG. 23 and represents the "So" output (a sample surface output) in the following mathematical operation: So=V1∩S1.

The Cubemath software 32c2 in FIG. 6, when executed by the workstation processor 32b in conjunction with the IESX Interpretation software 32c1, will perform mathematical operations on seismic volumes (i.e.—a pair of volumes of 3D seismic data) to combine, contrast, and transform the original inputs into a particular output, which particular output is used by the geoscientist to determine various characteristics of an earth formation for the ultimate purpose of determining the underground content of hydrocarbon deposits (e.g.—the presence of oil). A few examples follow:

1. Lithologic Interpretation—This is an example of the use of the aforementioned "single seismic two processing method operation"—Techniques are available to analyze pre-stack seismic data for amplitude versus offset (AVO) effects. Two output volumes created from this process are the pressure wave stack (P) and the gradient volume (G). The combination as a product (P×G) of these can be used by geoscientists as a lithology indication. Their sum (P+G) is related to Poisson's ratio, an elastic property of rock. Their difference (P−G) is an estimate of the Shear wave response.

2. Time to Depth Transform—The analysis of pre-stack seismic data and well information can yield an average velocity volume which can be combined with the seismic information for transformation to depth. The process involves multiple operations as follows: multiply average velocity at each seismic volume time step and the time step index to yield a depth index (V×T), then, interpolate the seismic amplitude to the desired depth index (sin x/x interpolation).

3. Analysis of 4D seismic (repeat seismic surveys for reservoir monitoring)—An analysis of the contrast between two seismic surveys acquired at the same location may indicate the migration of reservoir fluids. A simple trace by trace subtraction could be used to highlight these differences if the acquisition of both data had been recorded identically. In general, there are slight differences which can be accounted for by additional operations to adjust time and/or amplitude differences between the data sets, i.e., cross correlation.

4. Sample variations—Many single volume, volume/surface, volume/trace operations can be performed for such applications as edge detection, volume slicing, hypothesis testing, and post stack processing. These require a combination of the basic mathematical functions provided in accordance with the present invention in this specification.

A functional description of the operation of the present invention will be set forth in the following paragraphs with reference to FIGS. 1–35 of the drawings.

The recording truck 20 of FIG. 1 is situated on the surface of the earth, as shown in FIG. 1. The explosive energy source 10 transmits sound vibrations 14 into the earth in response to the explosion of the energy source 10, the sound vibrations 14 initially propagating downwardly as noted in FIG. 1, reflecting off a layer 16 of the earth's surface, and propagating upwardly to the surface. The sound vibrations 14 will be received in and measured by a plurality of geophones 18 situated at the earth's surface. The geophones 18 will transmits one or more electrical signals, in response to the receipt of the sound vibrations 14, the electrical signals being received in the recording truck computer 20a. In FIG. 2, the recording truck 20 moves a distance of about 50 feet to a second position (position 1), and repeats the above procedure, whereupon another set of one or more electrical signals are received in the recording truck computer 20a. The recording truck 20 moves eight more times to position 9 in FIG. 2 where another set of one or more electrical signals are received in the recording truck computer 20a. Ten sets of electrical signals are received, at time "t1", in the recording truck computer 20a of FIG. 3 and stored in memory 20a2. A first set of 3D seismic data are now stored in the memory 20a2 of the recording truck computer 20a.

Assuming that a "repeat seismic operation" is being performed, at time "t2" (typically, about 6 months later), the procedure described above in the preceding paragraph is repeated again, and, as a result, a second set of 3D seismic data are stored in the memory 20a2 of the recording truck computer 20a.

Two (2) output record mediums 20a4 of FIG. 3 are generated, a first which stores the first set of 3D seismic data, and a second which stores the second set of 3D seismic data.

The first and second set of 3D seismic data stored in the first and second output record mediums 20a4 are each loaded into the mainframe computer 30 of FIG. 4. Each set of 3D seismic data undergoes "data reduction" processing in the mainframe computer 30 of FIG. 4 using the data reduction software 30b shown in FIGS. 4, 7a, and 7b of the drawings. As a result, two "reduced data output record mediums" 30d, of FIG. 3, are generated, a first reduced data output record medium 30d storing a first data-reduced set of 3D seismic data obtained at time "t1", and (assuming that the "repeat seismic operation" is being performed) a second reduced data output record medium 30d storing a second data-reduced set of 3D seismic data obtained at time "t2", about 6 months after time "t1".

The first and second reduced data output record mediums 30d are each loaded into the workstation 32, as shown in FIGS. 5 and 6.

At this point, as shown in FIG. 8, the workstation processor 32b of FIG. 6 resides in the initial state 50 in FIG. 8. In FIG. 23, the window display 33 is being presented to an operator at the workstation 32 display 32a. The first cube 34 in FIG. 23 represents the first data-reduced set of 3D seismic data which was measured by the geophones 18 and obtained at time "t1" and originally stored on the first reduced data output record medium 30d, the second cube 36 of FIG. 23 representing the second data-reduced set of 3D seismic data which was measured by the geophones 18 and obtained at time "t2" (assuming that the "repeat seismic operation" is being performed) and originally stored on the second reduced data output record medium 30d. In FIG. 8, by clicking on the first cube 36 of FIG. 23, the operator at workstation 32 selects primary data 56. Now, he must select the data type 58. In FIG. 24, the operator selects either volume-1 60a or surface-1 60b. In FIG. 8, the selection of volume-1 60a of FIG. 24 would mean selecting volume 62 in FIG. 8, and the selection of surface-1 60b of FIG. 24 would mean selecting surface 66 in FIG. 8. Assume for purposes of this discussion that the operator selected volume-1 60a in FIG. 24 which means that, in FIG. 8, the operator selected volume 62. At this point, in FIG. 8, the volume selection block 64 in FIG. 8 will be executed. A brief reference to FIG. 17 reveals that, when the volume selection block 64 of FIG. 8 is executed, the window display 65 in FIG. 29 is presented to the operator on display 32a of the workstation 32, and, using window display 65, the operator will select path 64b, select time range 64f, select trace range 64e, and select line range 64d, at which point, the program will loop back to the volume ok state. When volume selection 64 of FIG. 8 is executed, the primary volume ready code 70 of FIG. 8 is ready for execution. In FIG. 9, the primary volume ready code 70 presents to the operator at workstation 32 the window display 82 shown in FIG. 25. In FIG. 25, the operator will click on the second cube 36 for selecting the secondary volume. Referring back to FIG. 9, the operator selects secondary data 70a and then selects the data type 70b. Referring back to FIG. 24, after the operator has clicked on the second cube 36, the following options are available for selection: volume-2 60c, surface-2 60d, trace 60e, and None 60f. Assume for purposes of this discussion that the operator clicks on "volume-2" 60c. Referring now to FIG. 9, clicking on volume-2 60c in FIG. 24 means that the operator at workstation 32 has selected volume 70c in FIG. 9. When the selection of volume 70c, associated with the secondary data 70a selection in FIG. 9, is complete, the volume selection code 70g in FIG. 9, associated with the secondary data selection, will be executed. Recall that the volume selection code 64 in FIG. 8, associated with the primary data selection, has already been executed. Execution of the volume selection code 70g requires another brief reference to FIG. 17. In FIG. 17, when the volume selection code 70g of FIG. 9 is executed, the window display 65 in FIG. 29 is presented to the operator on display 32a of the workstation 32, and, using window display 65, the operator will select path 64b, select time range 64f, select trace range 64e, and select line range 64d, at which point, the program will loop back to the volume ok state. When volume selection code 70g of FIG. 9 is executed, the volume volume ready code 70j of FIG. 9 is ready for execution. Refer to FIG. 11 for the volume volume ready code 70j.

The volume volume ready code 70j shown in FIG. 11 of the cubemath software 32c2 of FIG. 6 is ready for execution. In FIG. 11, it is now necessary to select a mathematical operation 70j1, and a number of available operations 70j2 are presented to the operator. In FIG. 26, a window display 82 is presented to the operator on display 32a of workstation 32. Several available mathematical operations 86 are presented to the operator at workstation 32. The operator uses a mouse 84 to select one of the mathematical operations 86. In FIG. 11, the mathematical operations 70j3, 70j4, 70j5, and 70j6 are available for selection. Assume that the operator selects mathematical operation 70j4 in FIG. 11. The operator set code 80 is now ready for execution. Refer to FIG. 15 for the operator set code 80.

In FIG. 15, execution of the operator set code 80 requires the selection of a particular output, that is, the selection of an output 80a and the selection of a particular data type 80b associated with the output 80a. At this point, window display 84 of FIG. 27 is presented to the operator on display 32a of the workstation 32. In FIG. 27, the operator uses mouse 84a to select one of two outputs 84b: either a volume-1 84b1 or a surface-1 84b2. Assume that the operator selects the volume-1 84b1. In FIG. 15, selection of volume-1 84b1 means that the operator has selected volume 80c in FIG. 15. Selection of the volume 80c means that the volume output definition code 80e in FIG. 15 will be executed. Refer to FIG. 21 for the volume output definition code 80e of FIG. 15.

In FIG. 21, having selected volume 80c, the volume output 80e1 code presents a window display 92 in FIG. 30 to the operator at the workstation 32. In FIG. 21, the operator defines a new seismic volume 80e2 by providing, in FIG. 30, the available survey and available class information 92a, the required output seismic class name 92b, and the output seismic class description 92c. In FIG. 21, now that the volume is defined 80e3, the program can either proceed to the output volume ok state 80e6, or the operator at workstation 32 can define an optional output 80e4, at which point, an optional output is defined 80e5 and the program can then proceed to the output volume ok state 80e6. Of course, the operator can dismiss 80e7 to the calling state, which causes the program to return to the state that made the volume selection request.

In FIG. 15, when the execution of the volume output definition code 80e is complete, the execution ready code 90 will be executed. Refer to FIG. 16 for the execution ready code 90 of FIG. 15.

In FIG. 16, when the execution ready code 90 begins execution, the window display 98 of FIG. 28 is presented to the operator at the workstation display 32a of FIG. 6. The operator will click on the "execute" icon 42 in FIG. 28, which means that "execute" 90a is being executed in FIG. 16. The program will continue to run 90b.

Reviewing the above paragraphs, in FIG. 8, 9, 11, 15, 16, 21, and 28, the operator will make the following selections:

(1) the operator selects primary data 56 by clicking on the first cube 34, (2) the operator selects the data type for the selected primary data, such as "volume 62", (3) the operator selects secondary data 70a in FIG. 9, (4) the operator selects the data type for the secondary data, such as volume 70c, (5) the operator selects a mathematical operation 70j1, and, in the example of the preferred embodiment in FIG. 11, the selected mathematical operation 70j4 is V3=V1/V2, (6) the operator selects an output 80a in FIG. 15, (7) the operator selects a data type 80b for the selected output, such as volume 80c, (8) the operator defines a new seismic volume 80e2 in FIG. 21, and (9) the operator selects the "execute" icon 42 in FIG. 28 which executes the "execute" code 90a in FIG. 16 and the program runs 90b.

When the operator selects the "execute" icon 42, the program runs 90b. As a result, the primary data 56 mathematically operates on the secondary data 70a, where the aforementioned mathematical operation consists of the selected mathematical operation 70j4 which was selected by the operator. An output 80a is generated (such as the outputs shown in FIGS. 34 and 35) which reflects the results of the mathematical operation, the output 80a being presented to the operator in the form of the selected data type (i.e., presented to the operator in the form of the selected volume 80c). In addition, a new seismic volume of data is created which contains the data of the output 80a.

The geoscientist analyses the output 80a for the purpose of determining the characteristics of the earth formation and the possibility of the existance of underground deposits of hydrocarbons. For example, as previously indicated, the geoscientist may use the output 80a to perform:

(1) Lithologic Interpretation—This is an example of the use of the aforementioned "single seismic two processing method operation"—Techniques are available to analyze pre-stack seismic data for amplitude versus offset (AVO) effects. Two output volumes created from this process are the pressure wave stack (P) and the gradient volume (G). The combination as a product (P×G) of these can be used by geoscientists as a lithology indication. Their sum (P+G) is related to Poisson's ratio, an elastic property of rock. Their difference (P−G) is an estimate of the Shear wave response.

(2) Time to Depth Transform—The analysis of pre-stack seismic data and well information can yield an average velocity volume which can be combined with the seismic information for transformation to depth. The process involves multiple operations as follows: multiply average velocity at each seismic volume time step and the time step index to yield a depth index (V×T), then, interpolate the seismic amplitude to the desired depth index (sin x/x interpolation).

(3) Analysis of 4D seismic (repeat seismic surveys for reservoir monitoring)—An analysis of the contrast between two seismic surveys acquired at the same location may indicate the migration of reservoir fluids. A simple trace by trace subtraction could be used to highlight these differences if the acquisition of both data had been recorded identically. In general, there are slight differences which can be accounted for by additional operations to adjust time and/or amplitude differences between the data sets, i.e., cross correlation.

(4) Sample variations—Many single volume, volume/surface, volume/trace operations can be performed for such applications as edge detection, volume slicing, hypothesis testing, and post stack processing. These require a combination of the basic mathematical functions provided in accordance with the present invention in this specification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. Apparatus adapted for generating an output record medium containing information indicative of a resultant set of characteristics of an earth formation, comprising:

first receiving and selection means for receiving a first set of seismic data relating to a first set of characteristics of said earth formation, said first receiving and selection means including means for selecting said first set of seismic data;

second receiving and selection means for receiving a second set of seismic data relating to a second set of characteristics of said earth formation, said second receiving and selection means including means for selecting said second set of seismic data;

third selection means for selecting a particular operation, said first set of seismic data operating on said second set of seismic data during said particular operation;

fourth selection means for selecting a particular type of output; and execution initiation means responsive to the selection of said first set of seismic data by said first receiving and selection means, the selection of said second set of seismic data by said second receiving and selection means, the selection of said particular operation by said third selection means, and the selection of said particular type of output by said fourth selection means for initiating an execute operation, said particular operation commencing in response to the initiation of said execute operation by said execution initiation means, said first set of seismic data and said second set of seismic data operating on each other during said particular operation, said output record medium being generated in the form of said particular type of output selected by said fourth selection means when said first set of seismic data is operated on said second set of seismic data, the particular type of output of said output record medium containing said information relating to said resultant set of characteristics of said earth formation.

2. The apparatus of claim 1, wherein said first receiving and selection means selects said first set of seismic data and classifies the selected first set of seismic data as either a volume or a surface.

3. The apparatus of claim 2, wherein said second receiving and selection means selects said second set of seismic data and classifies the selected second set of seismic data as either a volume, a surface, a trace, or null.

4. The apparatus of claim 3, wherein said third selection means selects a particular mathematical operation, said first set of seismic data selected by said first receiving and selection means mathematically operating on said second set of seismic data selected by said second receiving and selection means during said particular mathematical operation.

5. The apparatus of claim 4, wherein said fourth selection means selects said particular type of output and classifies said particular type of output as either a volume or a surface.

6. The apparatus of claim 5, wherein said execution initiation means initiates said execute operation in response to the selection of the volume or surface type of said first set of seismic data selected by said first receiving and selection means, the volume or surface or trace or null type of said second set of seismic data selected by said second receiving and selection means, said particular mathematical operation by said third selection means, and the volume or surface type of said particular type of output selected by said fourth selection means, said particular type of output being generated in response to the initiation of said execute operation, said particular type of output containing said information relating to said resultant set of characteristics of said earth formation.

7. A method of determining a set of characteristics of an earth formation, an existance of an underground deposit of hydrocarbon in said earth formation being determined from said set of characteristics, comprising:

(a) performing at least one seismic operation above said earth formation to produce a first set of information and a second set of information;

(b) operating on said first set of information and said second set of information to produce an output which includes a third set of information, the operating step (b) including the steps of, (b1) selecting said first set of information;
(b2) selecting said second set of information;
(b3) selecting a particular mathematical operation;
(b4) selecting a particular type of output; and
(b5) during said particular mathematical operation selected during the selecting step (b3), operating said first set of information selected during the selecting step (b1) on said second set of information selected during the selecting step (b2) to produce said particular type of output selected during the selecting step (b4), said particular type of output including said third set of information, the set of characteristics of said earth formation being determined from said output, said existance of the underground deposit of hydrocarbon being determined from said set of characteristics of said earth formation.

8. The method of claim 7, wherein the performing step (a) includes the steps of:

(a1) performing a first seismic operation above said earth formation at a time t1 to produce an output record medium containing first information; and (a2) data reducing said first information on said output record medium to produce a first reduced data output record medium containing said first set of information.

9. The method of claim 8, wherein the performing step (a) further includes the steps of:

(a3) performing a second seismic operation above said earth formation at a time t2 to produce a second output record medium containing second information, said time t2 being different than said time t1; and (a4) data reducing said second information on said second output record medium to produce a second reduced data output record medium containing said second set of information.

10. A seismic data interpretation apparatus adapted for generating an output record containing information relating to a set of characteristics of an earth formation, said characteristics of said earth formation being determined from said output record, comprising:

first selection means for selecting a first set of data representative of said characteristics of said formation;

second selection means for selecting a second set of data representative of said characteristics of said formation;

operation means responsive to said first set of data obtained from said first selection means and said second set of data obtained from said second selection means for allowing said first set of data to operate on said second set of data and generating a set of results when the first set of data is operated on said second set of data; and output record generation means responsive to said set of results for generating an output record which contains said set of results, said set of results representing said information relating to said set of characteristics of said earth formation.

11. The seismic data interpretation apparatus of claim 10, wherein said operation means comprises:

first classifying means for classifying said first set of data as either a volume or a surface;

second classifying means for classifying said second set of data as either a volume or a surface or a trace;

operation selection means for selecting a particular mathematical operation; and execution means for performing said particular mathematical operation on the volume or the surface of said first set of data and the volume or the surface or the trace of said second set of data and responsive thereto for generating said output record which contains said set of results that are indicative of said information relating to said set of characteristics of said earth formation.

12. The seismic data interpretation apparatus of claim 11, further comprising:

output selection means responsive to the selection of said particular mathematical operation by said operation selection means for selecting a particular type of output; and third classifying means responsive to the selection of said particular type of output by said output selection means for classifying said particular type of output as either a volume or a surface, said execution means performing said particular mathematical operation on the volume or the surface of said first set of data and the volume or the surface or the trace of said second set of data and responsive thereto for generating the volume or the surface of said particular type of output, said particular type of output being said output record which contains said set of results that are indicative of said information relating to said set of characteristics of said earth formation.

13. A seismic data interpretation apparatus adapted for generating an output record containing information relating to a set of characteristics of an earth formation, said characteristics of said earth formation being determined from said output record, comprising:

first selection means for selecting a first set of data and a second set of data representative of said characteristics of said formation;

operation means responsive to said first set of data and said second set of data selected by said first selection means for allowing said first set of data and said second set of data to mathematically operate on each other and generating a set of results when the mathematical operation is complete; and output record generation means responsive to said set of results for generating an output record which contains said set of results, said set of results representing said information relating to said set of characteristics of said earth formation.

14. The seismic data interpretation apparatus of claim 13, wherein said operation means comprises:

first classifying means for classifying said first set of data as either a volume or a surface;

second classifying means for classifying said second set of data as either a volume or a surface or a trace;

operation selection means for selecting a particular mathematical operation; and execution means for performing said particular mathematical operation selected by said operation selection means on the volume or the surface of said first set of data and the volume or the surface or the trace of said second set of data, said execution means generating said output record which contains said set of results indicative of said information relating to said set of characteristics of said earth formation.

15. The seismic data interpretation apparatus of claim 14, further comprising:

output selection means responsive to the selection of said particular mathematical operation by said operation selection means for selecting a particular type of output; and third classifying means responsive to the selection of said particular type of output by said output selection means for classifying said particular type of output as either a volume or a surface, said execution means performing said particular mathematical operation on the volume or the surface of said first set of data and the volume or the surface or the trace of said second set of data and generating the volume or the surface of said particular type of output, said particular type of output being said output record which contains said set of results indicative of said information relating to said set of characteristics of said earth formation.

16. A seismic data interpretation apparatus, comprising:

first seismic data set receiving means for receiving a first seismic data set;

second seismic data set receiving means for receiving a second seismic data set; and an operation apparatus which is responsive to the first seismic data set and the second seismic data set and which implements an algorithm that is adapted for executing a mathematical operation, wherein, during said mathematical operation, a first said data set approximately simultaneously operates on a second said data set to thereby derive a third data set.

17. The seismic data interpretation apparatus of claim 16, further comprising output generation means for generating an output medium which contains and represents said third data set.

18. The seismic data interpretation apparatus of claim 17, wherein said first seismic data set receiving means comprises first seismic data set selection means responsive to said first seismic data set received from said first seismic data set receiving means for selecting said first seismic data set thereby generating said first seismic data set.

19. The seismic data interpretation apparatus of claim 18, further comprising first classifying means responsive to the first seismic data set generated from the first seismic data set selection means for classifying said first seismic data set as either a volume or a surface.

20. The seismic data interpretation apparatus of claim 18, wherein said second seismic data set receiving means comprises second seismic data set selection means responsive to said second seismic data set received from said second seismic data set receiving means for selecting said second seismic data set thereby generating said second seismic data set.

21. The seismic data interpretation apparatus of claim 20, further comprising second classifying means responsive to the second seismic data set generated from the second seismic data set selection means for classifying said second seismic data set as either a volume or a surface or a trace.

22. The seismic data interpretation apparatus of claim 20, wherein said operation apparatus comprises means for selecting a particular said mathematical operation.

23. The seismic data interpretation apparatus of claim 22, wherein said output generation means includes output selection means for selecting a particular type of output to represent said output medium.

24. The seismic data interpretation apparatus of claim 23, further comprising third classifying means responsive to the selection of said particular type of output by said output selection means for classifying said particular type of output as either a volume or a surface.

25. A method of processing seismic data for determining a set of characteristics of an earth formation, comprising the steps of:

(a) selecting a first set of seismic data;

(b) selecting a second set of seismic data; and (c) executing a mathematical operation, wherein, during said mathematical operation, said first set of seismic data is operated on said second set of seismic data to derive a third set of data.

26. The method of claim 25, wherein the selecting step (a) comprises the steps of:

(a1) selecting said first set of seismic data; and (a2) selecting either a volume or a surface to represent said first set of seismic data.

27. The method of claim 26, wherein the selecting step (b) comprises the steps of:

(b1) selecting said second set of seismic data; and (b2) selecting either a volume or a surface or a trace to represent said second set of seismic data.

28. The method of claim 25, wherein the executing step (c) further comprises the steps of:

(c1) selecting a particular type of mathematical operation; and (c2) executing said particular type of mathematical operation, wherein, during said particular type of mathematical operation, said first set of seismic data is operated on said second set of seismic data to derive said third set of data.

29. The method of claim 28, further comprising the step of:

(d) generating an output medium reflecting said third set of data.

30. The method of claim 29, wherein the generating step (d) further comprises the steps of:

(d1) selecting a specific type of output; and (d2) generating said output medium, in the form of said specific type of output, reflecting said third set of data.

31. The method of claim 30, wherein the selecting step (d1) further comprises the step of selecting either a volume or a surface to represent said specific type of output.

32. A program storage device readable by a machine, tangibly embodying a program of instructions executable by the machine to perform method steps for determining a set of characteristics of an earth formation, said method steps comprising:

(a) selecting a first set of seismic data;

(b) selecting a second set of seismic data; and (c) executing a mathematical operation, wherein, during said mathematical operation, said first set of seismic data is operated on said second set of seismic data to derive a third set of data.

33. The program storage device of claim 32, wherein the selecting step (a) comprises the steps of:

(a1) selecting said first set of seismic data; and (a2) selecting either a volume or a surface to represent said first set of seismic data.

34. The program storage device of claim 33, wherein the selecting step (b) comprises the steps of:

(b1) selecting said second set of seismic data; and (b2) selecting either a volume or a surface or a trace to represent said second set of seismic data.

35. The program storage device of claim 32, wherein the executing step (c) further comprises the steps of:

(c1) selecting a particular type of mathematical operation; and (c2) executing said particular type of mathematical operation, wherein, during said particular type of mathematical operation, said first set of seismic data is operated on said second set of seismic data to derive said third set of data.

36. The program storage device of claim 35, further comprising the steps of:

(d) generating an output medium reflecting said third set of data.

37. The program storage device of claim 36, wherein the generating step (d) further comprises the steps of:

(d1) selecting a specific type of output; and (d2) generating said output medium, in the form of said specific type of output, reflecting said third set of data.

38. The program storage device of claim 37, wherein the selecting step (d1) further comprises the step of selecting either a volume or a surface to represent said specific type of output.

* * * * *